US009275238B2

(12) United States Patent  
Wang

(10) Patent No.: US 9,275,238 B2  
(45) Date of Patent: Mar. 1, 2016

(54) METHOD AND APPARATUS FOR DATA SECURITY READING

(75) Inventor: Jiaxiang Wang, Beijing (CN)

(73) Assignee: Antaios (Beijing) Information Technology Co., Ltd., Beijing (CN)

( * ) Notice: Subject to any disclaimer, the term of this patent is extended or adjusted under 35 U.S.C. 154(b) by 0 days.

(21) Appl. No.: 14/113,577

(22) PCT Filed: Apr. 29, 2011

(86) PCT No.: PCT/CN2011/073492
§ 371 (c)(1),
(2), (4) Date: Oct. 23, 2013

(87) PCT Pub. No.: WO2012/145915
PCT Pub. Date: Nov. 1, 2012

(65) Prior Publication Data

US 2014/0047553 A1    Feb. 13, 2014

(51) Int. Cl.
*G06F 21/60* (2013.01)
*G06F 21/56* (2013.01)

(52) U.S. Cl.
CPC .............. *G06F 21/60* (2013.01); *G06F 21/566* (2013.01)

(58) Field of Classification Search
None
See application file for complete search history.

(56) References Cited

U.S. PATENT DOCUMENTS

| 7,792,300 | B1 * | 9/2010 | Caronni ........................ 380/277 |
| 7,886,287 | B1 | 2/2011 | Davda |
| 2004/0133777 | A1 * | 7/2004 | Kiriansky et al. ............. 713/166 |
| 2005/0261857 | A1 * | 11/2005 | Jones et al. ................... 702/119 |
| 2008/0127338 | A1 | 5/2008 | Cho et al. |
| 2009/0059940 | A1 * | 3/2009 | Sultan .......................... 370/401 |
| 2011/0153944 | A1 * | 6/2011 | Kursawe ....................... 711/122 |

FOREIGN PATENT DOCUMENTS

| CN | 1373402 A | 10/2002 |
| CN | 1475909 A | 2/2004 |
| CN | 101004702 A | 7/2007 |
| CN | 101082886 A | 12/2007 |

OTHER PUBLICATIONS

International Search Report dated Feb. 9, 2012 from corresponding International Application No. PCT/CN2011/073492.
International Search Report dated Dec. 29, 2011 from potentially related International Application No. PCT/CN2011/073493.
International Search Report dated Feb. 23, 2012 from potentially related International Application No. PCT/CN2011/073495.

* cited by examiner

*Primary Examiner* — Harunur Rashid
*Assistant Examiner* — Andrew Steinle
(74) *Attorney, Agent, or Firm* — Wolf, Greenfield & Sacks, P.C.

(57) ABSTRACT

A method for data security reading includes steps of: receiving a hardware instruction; analyzing said hardware instruction; if said hardware instruction is a reading instruction, obtaining the source address in the reading instruction; searching a mapping bitmap and modifying the reading address in the reading instruction according to the data of the mapping bitmap, wherein the mapping bitmap is used to indicate whether the data stored in a local storage address is dumped to said security storage device; transmitting the modified reading instruction to a hardware layer. An apparatus for data security reading includes a receiving unit, an instruction analyzing unit, an instruction modifying unit and a transmitting unit. The Trojan horse or malicious tools cannot store or transmit the acquired information even if the secret information has been obtained, so that the data always exists in controllable security range.

17 Claims, 14 Drawing Sheets

METHOD AND APPARATUS FOR DATA SECURITY READING

FIELD OF THE DISCLOSURE

The present disclosure is related to the field of data security, and more particularly, to a method and device for data security reading.

BACKGROUND OF THE DISCLOSURE

Existing electronic information security field have three sub-fields including the system security, data security and device security.

In the field of the data security, there are nowadays three techniques to keep data safe: (1) data content security technique, including data encryption-decryption technique and end-to-end data encryption technique, which is used to guarantee that data content is not accessed illegally during the storage and transmission process; (2) data security transfer technique including techniques to prevent unauthorized copying, printing or other output action, which is used to guarantee that data content is safe during the use and transmission process; (3) network isolation technique, which includes techniques such as network physical isolation and setting up network security barrier.

However, since the above techniques are not capable of fully addressing the problems such as computer OS kernel viruses, Trojan horses, operating system loophole or vulnerability, system back door and divulging secrets, malicious codes may exist on a computing device like a computer. According to analysis from AV-Test lab, total effective detection rate for hazardous behavior in computers is 50% at most. Once malicious codes enter a terminal system, the above encryption technique, anti-copy technique and network blocking technique are of no help or ineffective. Further, existing hacker techniques can penetrate or break above security techniques and implant malicious codes using operating system loophole and system back door, and steal user data by the malicious code. And the above techniques cannot prevent secret-related personnel from divulging secrets actively or passively, for example, an employee can use portable storage equipment to download information or data from an internal network or a terminal to cause a secret leak.

As illustrated in FIG. 1, there shows a schematic diagram of an existing computer terminal system which includes a user interface layer 101, an application layer 102, an operating system (OS) kernel layer 103, a hardware mapping layer 104 and a hardware layer 105. Users of such terminal system operate the computer terminal system and have graphical or non-graphical feedback through the user interface of user interface layer 101. Taking the operation of saving data as an example:

(1) the user selects the function of "save" on the user interface provided by an application program;
(2) application layer 102 invokes or calls the corresponding code, which transforms the "save" instruction into one or more interface functions provided by the operating system, that is to say, the "save" operation becomes a call to a series of interface functions provided by the operating system;
(3) the OS kernel layer 103 receives the above call to the interface functions of operating system, and transforms each of the interface functions of operating system to one or more interface functions provided by the hardware mapping layer 104, that is to say, the "save" operation becomes a call to a series of interface functions provided by the hardware mapping layer 104;
(4) each of the interface functions provided by the hardware mapping layer 104 is transformed into one or more hardware instruction calls in the hardware mapping layer 104;
(5) hardware of the hardware layer 105 such as CPU receives the hardware instruction calls and executes hardware instructions.

When the above computer terminal is invaded by malicious codes, the malicious codes can access data in the system; after stealing data, the behavior pattern of malicious codes includes (1) storage action: to save the target data to certain storage location; and (2) transmission action: to transmit directly the stolen data or target data to a specified destination address through internet. In addition, the behavior pattern of divulging secrets by secret-related personnel who use the above computing device or information equipment includes: (1) divulging secrets actively: secret-related personnel get confidential information directly by ways like active copy, using malicious tools to penetrate security system, implant Trojan horses etc.; (2) divulging secrets passively: computers or storage mediums used by secret-related personnel are improperly used or lost which causes secrets leaks, e.g., the secret leaks caused by a secret-related device being connected directly to the Internet.

Therefore, a computer terminal system applying the above data security techniques in computer terminal system still faces the following problems: (1) anti-copy technique based on equipment filtering cannot prevent the confidential information at the terminals from being illegally stored; (2) techniques based on network filtering cannot guarantee that confidential information is fully under control; (3) secret-related personnel divulge secrets through malicious codes or tools; and (4) secret-related personnel divulge secrets because secret-related devices or storage mediums are lost.

In conclusion, there is a need for a method which can guarantee data security even after a terminal system is invaded by a malicious code.

SUMMARY

The present disclosure provides a method to guarantee the data security after a terminal system is invaded by malicious codes, so as to improve the data security.

According to an aspect of the present disclosure, there is provided a data security reading method, comprising: receiving a hardware instruction; analyzing the hardware instruction, if the hardware instruction is a read instruction, acquiring a source address of the read instruction; looking up in a bitmap, and modifying the source address of the read instruction according to the data of the bitmap; the bitmap being used to represent whether or not data of a local storage address is stored or dumped onto a security device; and sending the modified read instruction to a hardware layer.

Optionally, the hardware instruction comes from a hardware mapping layer.

Optionally, if the hardware instruction is not a read instruction or the source address is an address of the security device, sending the received hardware instruction to a hardware layer directly.

Optionally, before receiving a hardware instruction, the method further includes: establishing communication between a computer terminal system and the security device; and synchronizing a second bitmap on the security device to the computer terminal system saving as a bitmap.

Optionally, the security device is a remote storage device, which is shared by a plurality of computer terminal systems.

Further, according to another aspect of the present disclosure, there is provided a data security reading device, comprising: a receiving unit, being adapted to receive a hardware instruction; an instruction analysis unit, being adapted to analyze the hardware instruction and to determine if the hardware instruction is a read instruction; and if the hardware instruction is a read instruction, instruction analysis unit being also adapted to acquire the source address of the read instruction and determine if the source address is an address on a security device; an instruction modification unit, being adapted to look up in a bitmap and to modify the source address of the read instruction according to the data of the bitmap; the bitmap being used to represent whether or not data of a local storage address is stored or dumped onto the security device; and a transmitting unit, being adapted to send the modified read instruction to a hardware layer.

Optionally, the hardware instruction comes from a hardware mapping layer.

Optionally, the data security reading device further comprises: a synchronization unit, being adapted to establish communication between a computer terminal system and the security device, and to synchronize the bitmap between the computer terminal system and the security device.

Optionally, the security device is a remote storage device, which is shared by a plurality of computer terminal systems.

Further, according to still another aspect of the present disclosure, there is provided a computer program product, including a computer readable medium storing a computer program for causing a computer to execute instructions according to any one of the above data security reading method.

Compared with the conventional art, the method and device has the following advantages:

1. together with the method for data security storage, the method for data security reading guarantees that all data are in security zone under control, and the dumped data may be accessed or read; and since no confidential information or data is saved locally, secret-related personnel is prevented from divulging secrets actively or passively;

2. when the security device is a remote storage device, it may be shared by multiple terminals, which improves space utilization of the security device.

DETAILED DESCRIPTION OF THE DISCLOSURE

In order to make those skilled in the art better understand the spirit of the disclosure, embodiments according to the disclosure will be illustrated in detail hereinafter in conjunction with drawings.

The following embodiments are only specific embodiments of the disclosure which are used to make those skilled in the art better understand the spirit of the disclosure, however, the scope of protection of the disclosure should not be limited to the specific descriptions of the specific embodiments, various modifications can be made to the specific embodiments of the disclosure by those skilled in the art without departing from the scope of spirit of the disclosure.

When a computer is running, a CPU address register keeps the address of a next machine instruction that is to be executed. To realize monitoring of runtime machine instructions, in some embodiments of the present disclosure, data of this register is acquired, one or more machine instructions to be executed are read according to the data of the register, and the instruction segment to be scheduled which is composed of the one or more machine instructions is modified, thus the control right may be acquired before each machine instruction is executed and analysis of the following instructions may be performed continuously. Further, in some embodiments of the present disclosure, after the step of acquiring the machine instruction segment to be scheduled, steps of processing target instructions in the machine instruction segment to be scheduled are performed, therefore, not only are the runtime instructions recombined and monitored, but also target instructions are modified and updated.

Figure 1:
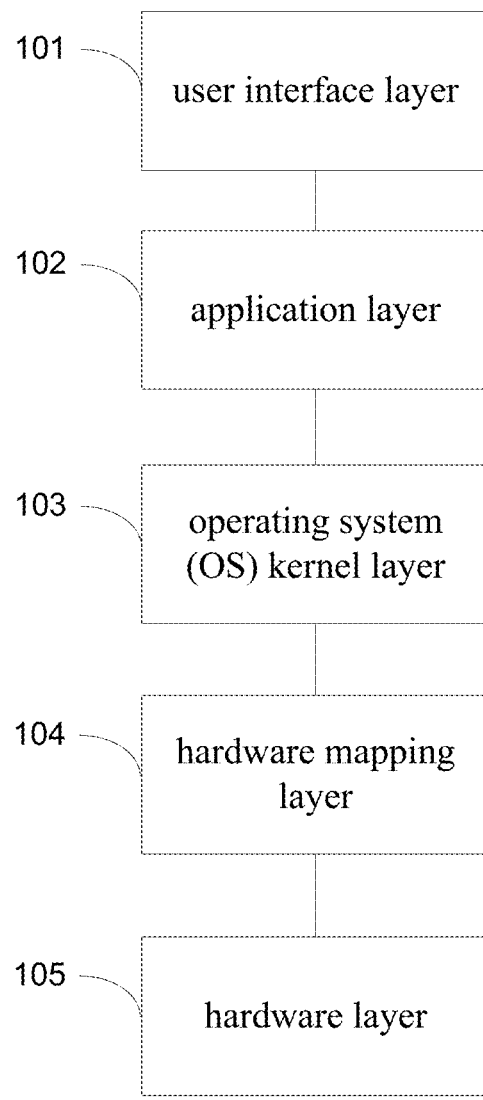
FIG. 1 is a schematic view showing a conventional computer terminal system which includes software and hardware layers.
Figure 2:
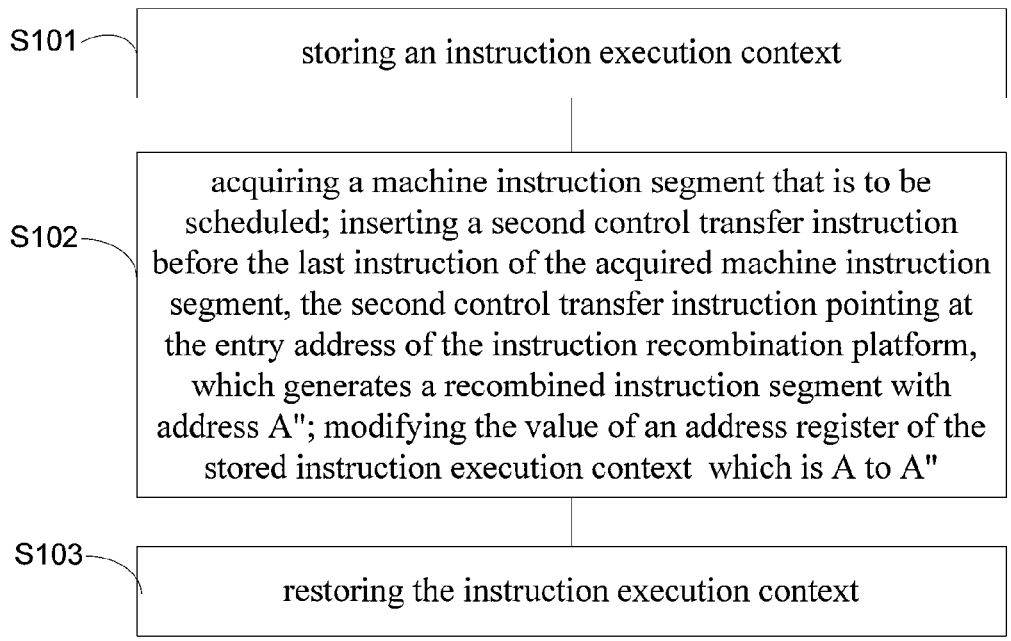
FIG. 2 is a flowchart of a runtime instruction recombination method provided in a first embodiment of the present disclosure.

According to a first embodiment of the present disclosure, there is provided a runtime instruction recombination method. As illustrated in FIG. 2, the method includes:

S101, storing an instruction execution context;

S102, acquiring a machine instruction segment that is to be scheduled; inserting a second control transfer instruction before the last instruction of the acquired machine instruction segment, the second control transfer instruction pointing at an entry address of an instruction recombination platform, which generates a recombined instruction segment with address A"; and modifying the value of the address register which is A to A"; and S103, restoring the instruction execution context.

Specifically, before the step S101 is performed, the method further includes a step to acquire the control right to run on CPU. When CPU performs this method, the method firstly stores the instruction execution context (i.e. step S101), that is to say, it stores the result of the monitored instruction which has just been executed. The CPU used in this embodiment is a central processing unit of X86-architecture; it may also be MIPS processor or processor of ARM architecture in other embodiments of the present disclosure. And one of ordinary skill in the art can appreciate that the CPU can be an instruction processing unit in computing devices of any other type.

In step S101, the step of the storing the instruction execution context includes: pushing register data that is related to instruction execution onto a stack. In other embodiments of the present disclosure, the instruction execution context can also be stored at other default or specified places or with other default or specified data structures.

In step S102, acquiring the machine instruction segment that is to be scheduled includes:

S1021, reading an address of the machine instruction to be scheduled from a CPU address register;

S1022, by using a control transfer instruction as the search target, searching machine instructions corresponding to the address of the machine instruction, until the first control transfer instruction is found, the control transfer instruction including JMP instruction and CALL instruction;

S1023, defining the first control transfer instruction and machine instructions before the first control transfer instruction as a machine instruction segment to be scheduled; and storing the machine instruction segment in the instruction recombination platform or other storage locations that the instruction recombination platform is able to access.

In other embodiments of the present disclosure, acquiring the machine instruction segment that is to be scheduled can also use non-control transfer instructions such as write instruction or read instruction as search target, to divide machine instructions into machine instruction segments. And since it needs to guarantee that the instruction recombination platform gets the control right of the CPU (i.e. the control right to run on CPU) after a control transfer instruction in a machine instruction segment is executed, control transfer instructions needs to be used as a supplemental or secondary search target, thereby resulting in machine instruction segments in smaller size.

Still in step S102, before inserting a second control transfer instruction JP2, the method provided in this embodiment can further include:

S1025, analyzing the machine instruction segment by using an instruction set to identify the machine instruction segment, in order to acquire a target machine instruction to be processed; the instruction set can be X86, MIPS, or ARM instruction set;

S1026, modifying the target machine instruction in a preset way.

With the above steps, runtime instruction monitoring can be realized, and other processes can be performed as well, which will be further discussed in the following embodiment.

Since the purpose of this embodiment is to realize the runtime instruction recombination, steps S1025 and S1026 are not performed, and the following steps are directly performed as follows: inserting a second control transfer instruction JP2 before the last instruction (which is a control transfer instruction JP1) of the acquired machine instruction segment, the second control transfer instruction JP2 pointing at the entry address of the instruction recombination platform, which generates a recombined instruction segment with address A"; modifying the value A of the address register of the stored instruction execution context to A". The instruction recombination platform is the execution platform of the instruction recombination method provided in this embodiment.

Inserting JP2 is to rerun the instruction recombination platform before JP1 when the CPU executes the machine instruction segment that is to be scheduled; then, the instruction recombination platform continues to analyze the next machine instruction segment to be scheduled, and repeats the steps in the above method to finish the recombination for all instructions. More details are to be discussed in the following analysis of step S103.

In step S103, restoring the instruction execution context includes: popping the register data related with the instruction execution from the stack, wherein the destination address of the control transfer instruction which is stored in the address register has already been modified to A" which is the entry address of the new machine instruction segment. After restoring the instruction execution context, the instruction recombination platform finishes operation this time; the CPU continues to perform the last instruction (which is a control transfer instruction) of the previous machine instruction segment, which destination address has been modified to A" as discussed above; the CPU performs the new machine instruction segment with the entry address of A". When the instruction segment with entry address of A" is performed to the penultimate instruction (which is the second control transfer instruction JP2), the instruction recombination platform gets the control right to run on the CPU again, and the instruction recombination platform repeats the process from step S101 to step S103.

Figure 3:
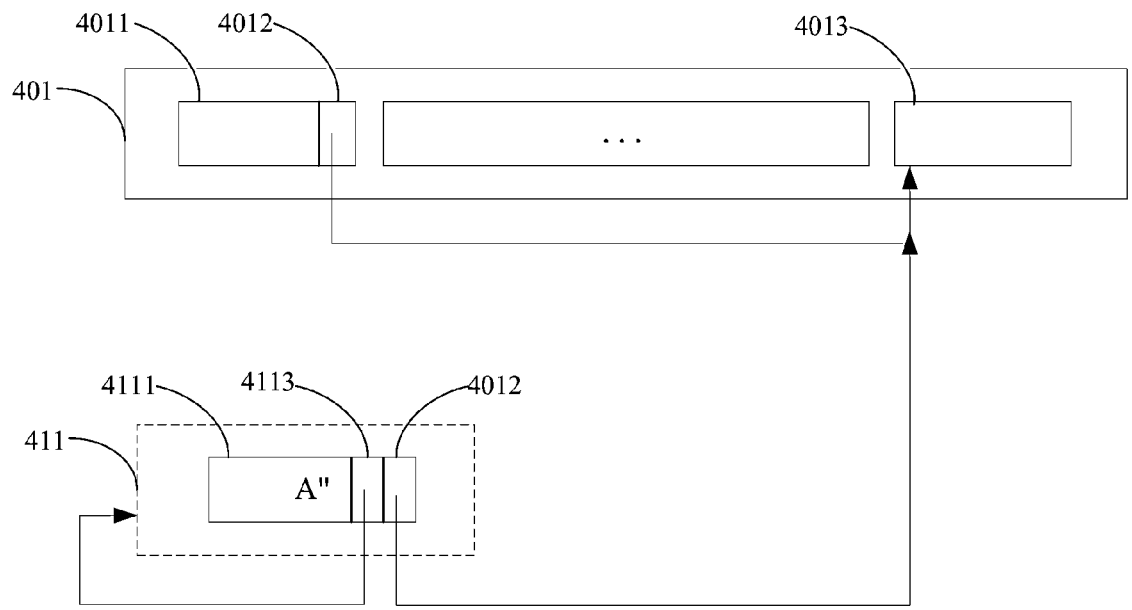
FIG. 3 is a schematic view showing an instruction recombination process and a recombined instruction segment in the first embodiment of the present disclosure.

Referring to FIG. 3, the instruction recombination process and the generation of a recombined instruction segment will be discussed in detail. A machine instruction set 401 that is to be scheduled is shown in FIG. 3, wherein the first control transfer instruction is a first control transfer instruction 4012; before instructions prior to the instruction 4012 are executed, destination address of the instruction 4012 is unknown if it is an variable, therefore, it assumes that the first control transfer instruction 4012 points to a machine instruction 4013; machine instructions including the first control transfer instruction 4012 and instructions prior to the instruction 4012 constitute a machine instruction segment 4011.

Still referring to FIG. 3, when an instruction recombination platform 411 runs, first the instruction execution context is stored; then the machine instruction segment 4011 is acquired; the instruction recombination platform inserts a second control transfer instruction 4113 before the first control transfer instruction 4012, the second control transfer instruction 4113 pointing to the instruction recombination platform 411 itself, which generates a recombined instruction segment 4111 having an address of A"; then the value A of the address register in the stored instruction execution context is modified to A"; at last, the instruction execution context is restored.

After the instruction recombination platform 411 finishes running, CPU continues to execute the last control transfer instruction of the previous recombined instruction segment, which has an address register's value of A". After the recombined instruction segment with an address of A" starts, when the second control transfer instruction 4113 is running, the instruction recombination platform 411 acquires the control right of the CPU again, and then continues to analyze the machine instructions to be scheduled, thus the method of runtime instruction recombination is finished.

Figure 4:
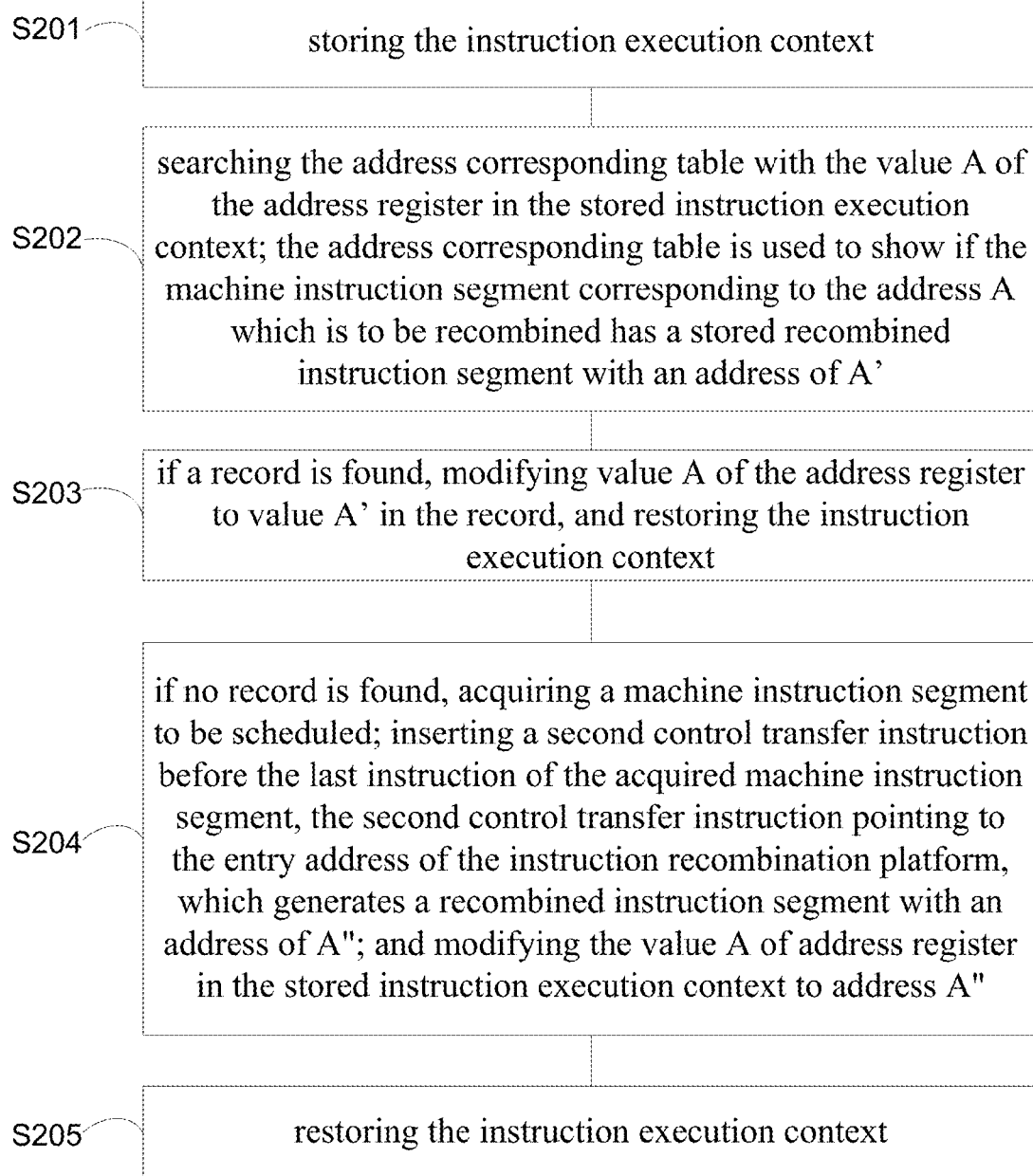
FIG. 4 is a flowchart of a runtime instruction recombination method provided in a second embodiment of the present disclosure.

Further, machine instructions of an executed program have high repeatability; to improve instruction recombination efficiency and save computing resource (e.g., CPU) of the computing device, according to a second embodiment of the present disclosure, there is provided a runtime instruction recombination method as shown in FIG. 4. The runtime instruction recombination method includes:

S201, storing the instruction execution context;

S202, searching an address corresponding table with the value A of the address register in the stored instruction execution context; the address corresponding table is used to show if the machine instruction segment corresponding to the address A which is to be recombined has a stored recombined instruction segment with an address of A';

S203, if a record is found, modifying value A of the address register to value A' in the record, and restoring the instruction execution context; the method is finished this time;

S204, if no record is found, acquiring a machine instruction segment to be scheduled; inserting a second control transfer instruction before the last instruction of the acquired machine instruction segment, the second control transfer instruction pointing to the entry address of the instruction recombination platform, which generates a recombined instruction segment with an address of A"; and modifying the value A of address register in the stored instruction execution context to address A";

S205, restoring the instruction execution context.

Also, the step S204 may further include: creating a record in the address corresponding table using the address A" and address A. And the recombined instruction segment with address A" is stored in the instruction recombination platform for reuse.

By using the address corresponding table, the method saves the computing resources and improves efficiency of runtime instruction recombination.

In the above embodiments, machine instructions, i.e. binary machine codes, are directly manipulated or handled; in other embodiments of the present disclosure, since there may be further operations like instruction modifications, the machine instruction segment to be scheduled can be firstly disassembled into assembly code segment for later use, and the assembly code segment is to be assembled into binary machine code before restoring the instruction execution context.

Figure 5:
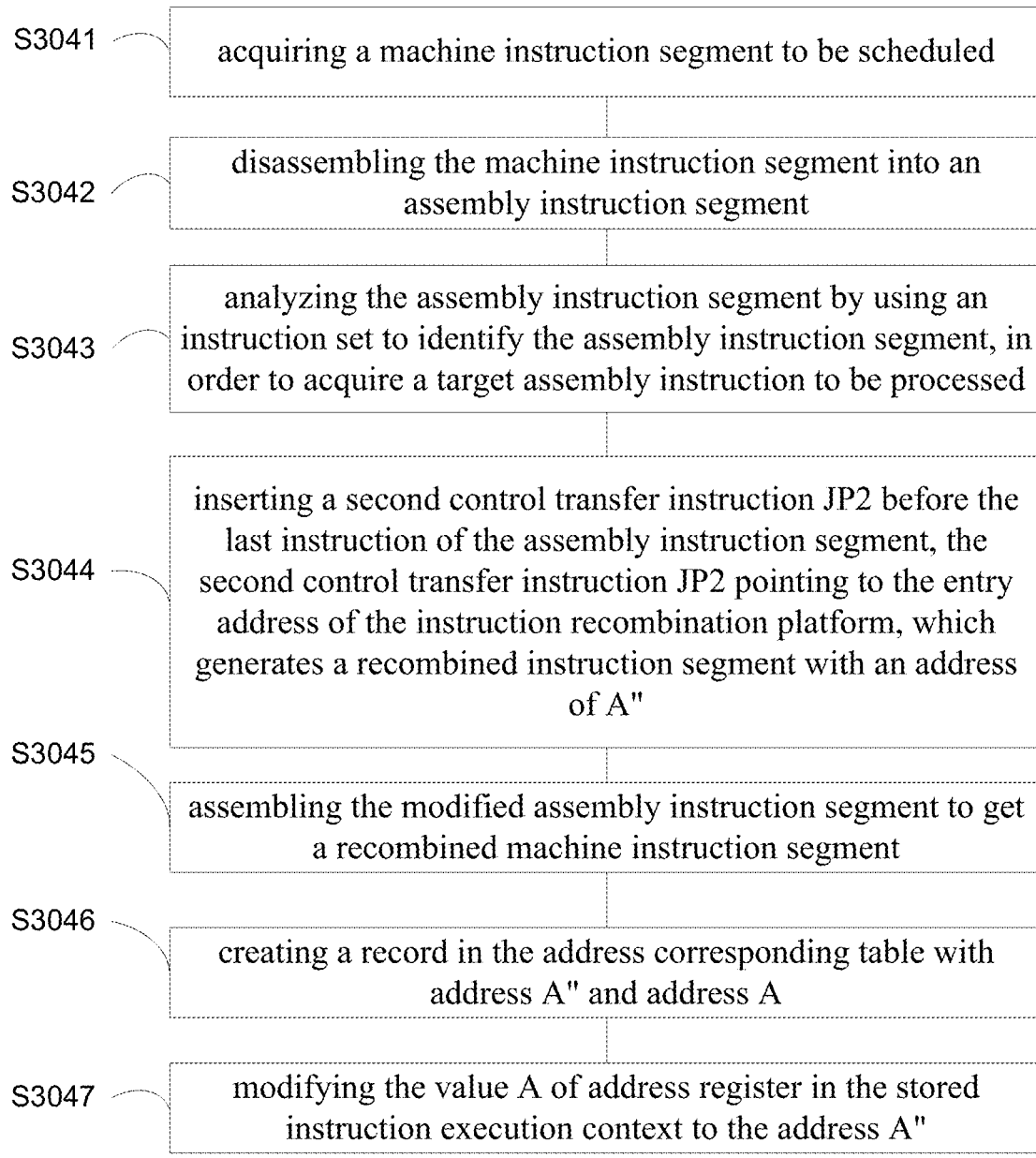
FIG. 5 is a flowchart of a runtime instruction recombination method provided in a third embodiment of the present disclosure.

According to a third embodiment of the present disclosure, there is provided a runtime instruction recombination method, including:

S301, storing a current instruction execution context;

S302, searching an address corresponding table with a value A of an address register in the stored instruction execution context;

S303, if a corresponding record is found, modifying the value A of the address register to a value A' in the record, and restoring the instruction execution context;

S304, if no record is found, a generating method of a recombined instruction is shown in FIG. 5, including:

S3041, acquiring a machine instruction segment to be scheduled;

S3042, disassembling the machine instruction segment into an assembly instruction segment;

S3043, analyzing the assembly instruction segment by using an instruction set to identify the assembly instruction segment, so as to acquire a target assembly instruction to be processed;

S3044, inserting a second control transfer instruction JP2 before the last instruction of the assembly instruction segment, the second control transfer instruction JP2 pointing to an entry address of the instruction recombination platform, which generates a recombined instruction segment with an address of A";

S3045, assembling the modified assembly instruction segment to get a recombined machine instruction segment;

S3046, creating a record in the address corresponding table with the address A" and address A;

S3047, modifying the value A of address register in the stored instruction execution context to the address A";

S305, restoring the instruction execution context.

Step S3042 and S3045 are corresponding disassembling and assembling steps. It's easy to perform further analyzing and modifying steps after the machine instruction segment is disassembled into assembly instruction segment. Other steps are similar with those in the above embodiment, which will not be discussed again.

The above runtime instruction recombination method provides basis for further applications. The following embodiments provide various runtime instruction recombination methods which perform different processing on machine instructions including store/read instruction, I/O instruction and network transmission instruction.

For a store/read instruction, according to a fourth embodiment of the present disclosure, there is provided a runtime instruction recombination method, including:

S401, storing a current instruction execution context;

S402, searching an address corresponding table with a value A of an address register in the stored instruction execution context;

S403, if a corresponding record is found, modifying the value A of the address register to a value A' in the record, and restoring the instruction execution context;

S404, if no record is found, a generating method of a recombined instruction includes:

S4041, acquiring a machine instruction segment to be scheduled;

S4042, disassembling the machine instruction segment into an assembly instruction segment;

S4043, analyzing the assembly instruction segment by using an instruction set to identify the assembly instruction segment, so as to acquire a target assembly instruction to be processed; the target assembly instruction being a store/read instruction;

S4044, if the assembly instruction segment includes a store/read instruction, modifying a store or read address of the store/read instruction to corresponding addresses on a security device;

S4045, inserting a second control transfer instruction JP2 before the last instruction of the assembly instruction segment, the second control transfer instruction JP2 pointing to an entry address of the instruction recombination platform, which generates a recombined instruction segment with an address of A";

S4046, assembling the modified assembly instruction segment to get a recombined machine instruction segment;

S4047, creating a record in the address corresponding table with the address A" and address A;

S4048, modifying the value A of the address register in the stored instruction execution context to the address A";

S405, restoring the instruction execution context.

In this embodiment, the target instruction is processed after the disassembling step; in other embodiments, target instructions may be processed directly by omitting the assembling and disassembling steps.

In step S4044, for store and read instructions, the target or source address in the store or read instruction is modified to achieve data dump, which is to save data onto a security device for data security. More details will be discussed in the following embodiments of the present disclosure.

For an I/O instruction, according to a fifth embodiment of the present disclosure, there is provided a runtime instruction recombination method, including:

S501, storing a current instruction execution context;

S502, searching an address corresponding table with a value A of an address register in the stored instruction execution context;

S503, if a corresponding record is found, modifying a value A of the address register to a value A' in the record, and restoring the instruction execution context;

S504, if no record is found, a generating method of a recombined instruction includes:

S5041, acquiring a machine instruction segment to be scheduled;

S5042, disassembling the machine instruction segment into an assembly instruction segment;

S5043, analyzing the assembly instruction segment by using an instruction set to identify the assembly instruction segment, so as to acquire a target assembly instruction to be processed; the target assembly instruction being a I/O instruction;

S5044, if the assembly instruction segment includes an I/O instruction, blocking all input instructions in the I/O instruction;

S5045, inserting a second control transfer instruction JP2 before the last instruction of the assembly instruction segment, the second control transfer instruction JP2 pointing to an entry address of the instruction recombination platform, which generates a recombined instruction segment with an address of A";

S5046, assembling the modified assembly instruction segment to get a recombined machine instruction segment;

S5047, creating a record in the address corresponding table with the address A" and address A;

S5048, modifying the value A of the address register in the stored instruction execution context to the address A"; 5505, restoring the instruction execution context.

In this embodiment, the target instruction is processed after the disassembling step; in other embodiments, target instructions may be processed directly by omitting the assembling and disassembling steps.

In the step S5044, all input instructions in the I/O instruction are blocked, to prevent a local hardware from writing operation; together with the process of store instruction in the last embodiment, all input instructions except store instruction can be blocked, which can improve the data security in computing device.

For a network transmission instruction, according to a sixth embodiment of the present disclosure, there is provided a runtime instruction recombination method including:

S601, storing a current instruction execution context;

S602, searching an address corresponding table with a value A of an address register in the stored instruction execution context;

S603, if a corresponding record is found, modifying the value A of the address register to a value A' in the record, and restoring the instruction execution context;

S604, if no record is found, a generating method of a recombined instruction includes:

S6041, acquiring a machine instruction segment to be scheduled;

S6042, disassembling the machine instruction segment into an assembly instruction segment;

S6043, analyzing the assembly instruction segment by using an instruction set to identify the assembly instruction segment, so as to acquire a target assembly instruction to be processed; the target assembly instruction being a network transmission instruction;

S6044, if the assembly instruction segment includes a network transmission instruction, determining if a destination address of the network transmission instruction which corresponds to a remote computing device is a permitted address; and if the destination address is not a permitted address, blocking the network transmission instruction;

S6045, inserting a second control transfer instruction JP2 before the last instruction of the assembly instruction segment, the second control transfer instruction JP2 pointing to an entry address of the instruction recombination platform, which generates a recombined instruction segment with an address of A";

S6046, assembling the modified assembly instruction segment to get a recombined machine instruction segment;

S6047, creating a record in the address corresponding table with the address A" and address A;

S6048, modifying the value A of the address register in the stored instruction execution context to the address A";

S605, restoring the instruction execution context.

In this embodiment, the target instruction is processed after the disassembling step; in other embodiments, target instructions may be processed directly by omitting the assembling and disassembling steps.

In step S6044, a network transmission instruction is processed to check if its destination address which corresponds to a remote computing device is a permitted address; if not, the network transmission instruction is blocked to realize secure data transmission.

The address corresponding table in the above embodiments are created and maintained by the instruction recombination platform, which may have a fixed-length array structure, a variable-length linked list structure, or other proper data structures for saving data pairs. Optionally, the length is adjustable and the space of the data structure can be released. The operation of releasing the space occupied by the address corresponding table may be performed periodically or in a random manner. In some embodiments, the address corresponding table further includes a data field saving the time for creating a record, which is used by the releasing operation to remove records according to the existence time. In some embodiments, the address corresponding table further includes a data field which is used as a usage counter; in the step of searching the address corresponding table, if a record is found, this field is updated or modified; and it is also used by the releasing operation to delete records according to the usage counter.

Further, in order to perform runtime instruction monitoring since the system startup and to achieve a full monitoring of the runtime instructions during operation stage of a computing device, according to another embodiment of the present disclosure, the load instruction which is used at the system startup is modified, and the instruction recombination platform provided in the present disclosure is called to perform the runtime instruction recombination method before the execution of the load instruction; since the jump address of the load instruction is a fixed known address, the instruction recombination platform may create the address corresponding table with a first record and create a first recombined instruction segment in advance.

Further, according to the present disclosure, there is also provided a computer readable medium storing a computer program for causing a computer to execute instructions according to runtime instruction recombination methods provided by the above embodiments.

According to another aspect and corresponding to the above runtime instruction recombination methods, there is provided a runtime instruction recombination device in a seventh embodiment of the present disclosure.

Figure 6:
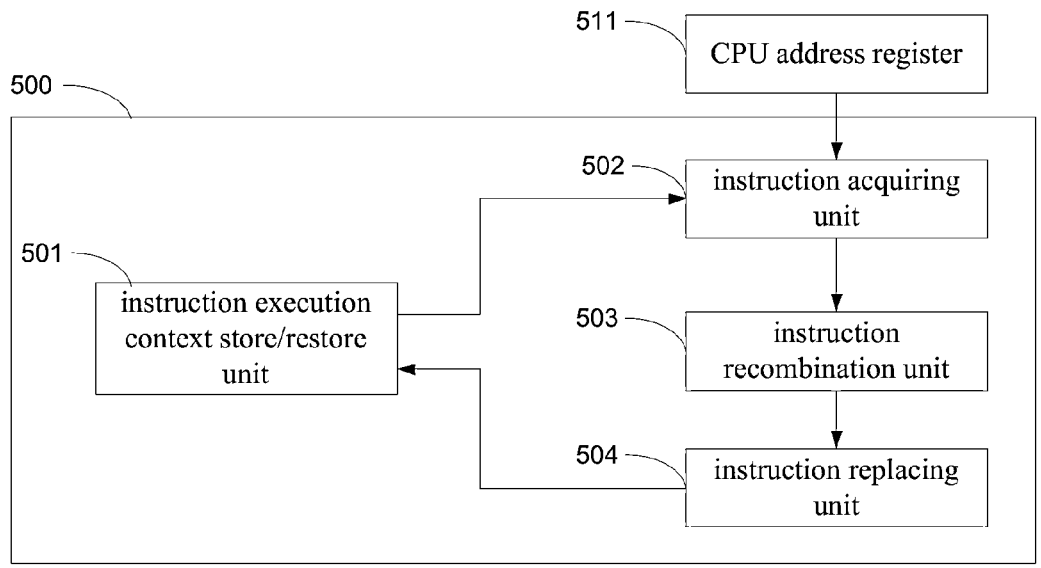
FIG. 6 is a schematic view showing a runtime instruction recombination device provided in a seventh embodiment of the present disclosure.

As illustrated in FIG. 6, the instruction recombination device 500 includes:

an instruction execution context store and restore unit 501, being adapted to store and restore an instruction execution context;

an instruction acquiring unit 502, being adapted to acquire a machine instruction segment to be scheduled, after the instruction execution context store and restore unit 501 stores the instruction execution context;

an instruction recombination unit 503, being adapted to analyze and modify the machine instruction segment to be scheduled and to generate a recombined instruction segment with address A"; and an instruction replacing unit 504, being adapted to modify a value of the address register in the stored instruction execution context to an address of the recombined instruction segment.

The instruction execution context store and restore unit 501 is coupled to the instruction acquiring unit 502 and the instruction replacing unit 504; the instruction acquiring unit 502, instruction recombination unit 503 and instruction replacing unit 504 are coupled in turn, which means that the instruction acquiring unit 502 is coupled to the instruction recombination unit 503 and the instruction recombination unit 503 is coupled to the instruction replacing unit 504.

The instruction recombination device 500 performs the runtime instruction recombination method in the following way:

first, the instruction execution context store and restore unit 501 stores the instruction execution context, which is to push instruction-execution-related register data onto a stack (e.g. a stack in memory);

then, the instruction acquiring unit 502 reads the address of the machine instruction to be scheduled from a CPU address register, and reads a machine instruction segment according to the address, the last instruction of the machine instruction segment being a control transfer instruction. Specifically, the instruction acquiring unit 502 reads an address of the machine instruction to be scheduled from a CPU address register 511, searches the machine instructions corresponding to the address using control transfer instruction as the search target until a first control transfer instruction (e.g. the control transfer instruction includes JMP instruction and CALL instruction) is found, defines the first control transfer instruction and all machine instructions before it as a machine instruction segment to be scheduled, and stores the machine instruction segment in the instruction recombination device 500 or other storage locations which the instruction recombination device 500 can access;

then, the instruction recombination unit 503 inserts a second control transfer instruction before the last instruction of the acquired machine instruction segment, the second control transfer instruction pointing to an entry address of the instruction recombination device, which generates a recombined instruction segment with address A";

then, the instruction replacing unit 504 modifies the value A of the address register in the stored instruction execution context to the address A"; and finally, the instruction execution context store and restore unit 501 restores the instruction execution context, which is to pop instruction-execution-related register data from the stack.

Further, according to an eighth embodiment of the present disclosure, there is provided a runtime instruction recombination device, which utilizes repeatability of instructions in execution to improve the recombination efficiency and save computing resource of the computing device.

Figure 7:
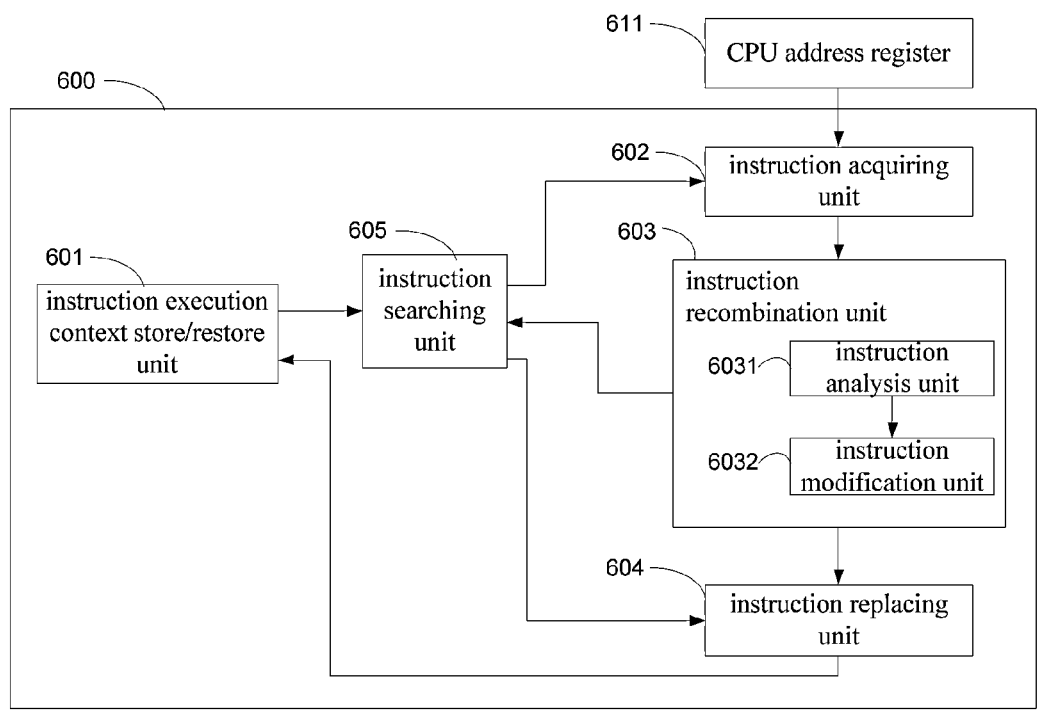
FIG. 7 is a schematic view showing a runtime instruction recombination device provided in an eighth embodiment of the present disclosure.

As shown in FIG. 7, the instruction recombination device 600 includes:

an instruction execution context store and restore unit 601, being adapted to store and restore instruction execution context;

an instruction acquiring unit 602, being adapted to acquire the machine instruction segment to be scheduled after the instruction execution context store and restore unit 601 stores the instruction execution context;

an instruction recombination unit 603, being adapted to analyze and modify the machine instruction segment to be scheduled, to generate a recombined instruction segment an address A";

an instruction replacing unit 604, being adapted to modify a value of an address register in the stored instruction execution context to the address of the recombined instruction segment; and an instruction searching unit 605, being adapted to search an address corresponding table using value A of the address register in the stored instruction execution context as a searching target; the address corresponding table being used to show if the machine instruction segment corresponding to the address A, which is to be recombined, has a stored recombined instruction segment with an address of A'; if a corresponding record is found, the instruction searching unit being adapted to call the instruction replacing unit to modify the value A of the address register to the value A' in the record; if no record is found, the instruction searching unit being further adapted to establish a record in an address corresponding table with the address A and address A" of a recombined result.

The instruction execution context store and restore unit 601 is coupled to the instruction searching unit 605 and instruction replacing unit 604; the instruction searching unit 605 is coupled to the instruction acquiring unit 602, the instruction recombination unit 603 and the instruction replacing unit 604; and the instruction acquiring unit 602, instruction recombination unit 603 and the instruction replacing unit 604 are coupled in turn.

The instruction recombination device 600 performs the runtime instruction recombination method in the following way:

first, the instruction execution context store and restore unit 601 stores the instruction execution context, which is to push instruction-execution-related register data onto a stack;

then, the instruction searching unit 605 searches an address corresponding table using the value A of the address register in the stored instruction execution context as the searching target;

where if a corresponding record is found, the instruction searching unit 605 calls the instruction replacing unit 604, the instruction replacing unit 604 modifies the value A of the address register to the value A' in the record; and the instruction replacing unit 604 calls the instruction execution context store and restore unit 602 to restore the instruction execution context, i.e. to pop instruction-execution-related register data from the stack, and recombination process is finished; and if no corresponding record is found, the instruction searching unit 602 reads the address of the machine instruction to be scheduled from the CPU address register, and reads a machine instruction segment according to the address, the last instruction of the machine instruction segment being a control transfer instruction. In specific, the instruction acquiring unit 602 reads an address of the machine instruction to be scheduled from the CPU address register 611, searches the machine instructions corresponding to the address using control transfer instruction as the search target until a first control transfer instruction (e.g. the control transfer instruction includes JMP instruction and CALL instruction) is found, defines the first control transfer instruction and all machine instructions before it as a machine instruction segment to be scheduled, and stores the machine instruction segment in the instruction recombination device 600 or other storage locations which the instruction recombination device 600 can access;

then, the instruction recombination unit 603 inserts a second control transfer instruction before the last instruction of the acquired machine instruction segment, the second control transfer instruction pointing to an entry address of the instruction recombination device, which generates a recombined instruction segment with address A";

then, the instruction recombination unit 603 sends the address A" to instruction searching unit 605, and the instruction searching unit 605 creates a record in the address corresponding table with address A" and address A, which is for reuse in the future;

then, the instruction replacing unit 604 modifies the value A of the address register in the stored instruction execution context to the address A";

finally, the instruction execution context store and restore unit 601 restores the instruction execution context, which is to pop the instruction-execution-related register data from the stack.

In this embodiment, the instruction recombination unit 603 further includes:

an instruction analysis unit 6031, being adapted to use an instruction set to identify the machine instruction segment in order to acquire a target machine instruction that is to be processed; the instruction set including X86, MIPS and ARM instruction set; and an instruction modification unit 6032, being adapted to modify or change the target machine instruction in a preset way.

If the target instruction is a store/read or save/read instruction, the instruction analysis unit 6031 is used to acquire the store/read instruction from the machine instruction segment to be scheduled, and the instruction modification unit 6032 is used to modify the store or read address in the store/read instruction to corresponding addresses on a security device. The effect is the same as the above corresponding embodiments of methods.

If the target instruction is an I/O instruction, the instruction analysis unit 6031 is used to acquire the I/O instruction from the machine instruction segment to be scheduled, and the instruction modification unit 6032 is used to block all input instructions of the I/O instruction. The effect is the same as the above corresponding embodiments of methods.

If the target instruction is a network transmission instruction, the instruction analysis unit 6031 is used to acquire the network transmission instruction from the machine instruction segment to be scheduled, and the instruction modification unit 6032 is used to check if a destination address of the network transmission instruction which corresponds to a remote computing device is a permitted address. If the destination address is not a permitted address, the instruction modification unit is also used to block the network transmission instruction. The effect is the same as the above corresponding embodiments of methods.

Figure 8:
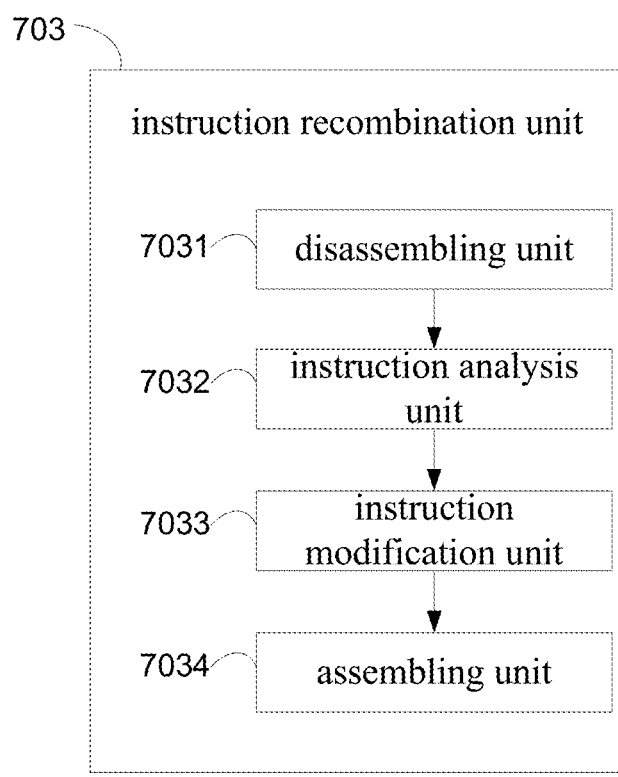
FIG. 8 is a schematic view showing an instruction recombination unit of a runtime instruction recombination device provided in a ninth embodiment of the present disclosure.

According to a ninth embodiment of the present disclosure, as shown in FIG. 8, the instruction recombination unit 703 further includes a disassembling unit 7031 and an assembling unit 7034. The disassembling unit 7031, an instruction analysis unit 7032, an instruction modification unit 7033 and the assembling unit 7034 are coupled or connected in turn. Other units in this embodiment are the same as those in the eighth embodiment of the present disclosure.

The disassembling unit 7031 is adapted to disassemble the machine instruction segment to be scheduled before analyzing and modifying the instruction segment, which generates an assembly instruction segment to be scheduled; and is adapted to send the assembly instruction segment to the instruction analysis unit 7032.

The assembling unit 7034 is adapted to assemble the recombined assembly instruction segment after analyzing and modifying the instruction segment, which generates a recombined machine instruction segment; and is adapted to send the recombined instruction segment in machine code to the instruction replacing unit.

In this embodiment, the instruction analysis unit 7032 and instruction modification unit 7033 is to handle the assembly instruction segment to be scheduled in the same way as described in previous embodiments.

In the above embodiments, the runtime instruction recombination method and device provided in embodiments of the present disclosure are described in detail; compared with the prior art, there are advantageous including:

(1) runtime instructions in a computing device are monitored by the instruction recombination method;

(2) instruction recombination efficiency is improved and computing resource can be saved by the address corresponding table;

(3) for store and read instructions, data dump is achieved by modifying the destination and source address in store and read instructions, which save data onto a security device to guarantee data security;

(4) for I/O instructions, all input instructions of the I/O instruction can be blocked, which prevents the local hardware from write operation; and all input instructions except store instruction can be blocked, which can improve the data security in a computing device;

(5) for network transmission instructions, data security transmission is achieved by determining if a destination address of the network transmission instruction which corresponds to a remote computing device is a permitted address and by blocking the network transmission instruction if the destination address is not.

For target instruction that is a store/read instruction, there will be more embodiments below; and in these embodiment, there are provided a data security storage and read method as well as a data security storage and read device.

As described in the background, when a computer terminal system described in the technical background is invaded by malicious codes, the malicious codes can obtain data from the computer system. After obtaining data, the behavior model of the malicious codes includes: (1) storing behavior: to store the target data in a certain storage location; (2) transmitting behavior: to transmit the stolen data directly to a designated destination address through internet. In addition, the behavior model of divulging secrets by the personnel who use computing device or information device includes: (1) actively divulging secret: secret-related personnel directly acquires confidential information by active copy, malicious tools which penetrate security system, or Trojan horses; and (2) passively divulging secret: computing devices or storage medium used by secret-related personnel are lost or misused such as directly connecting a secret-related device to the Internet which divulges secrets.

Figure 9:
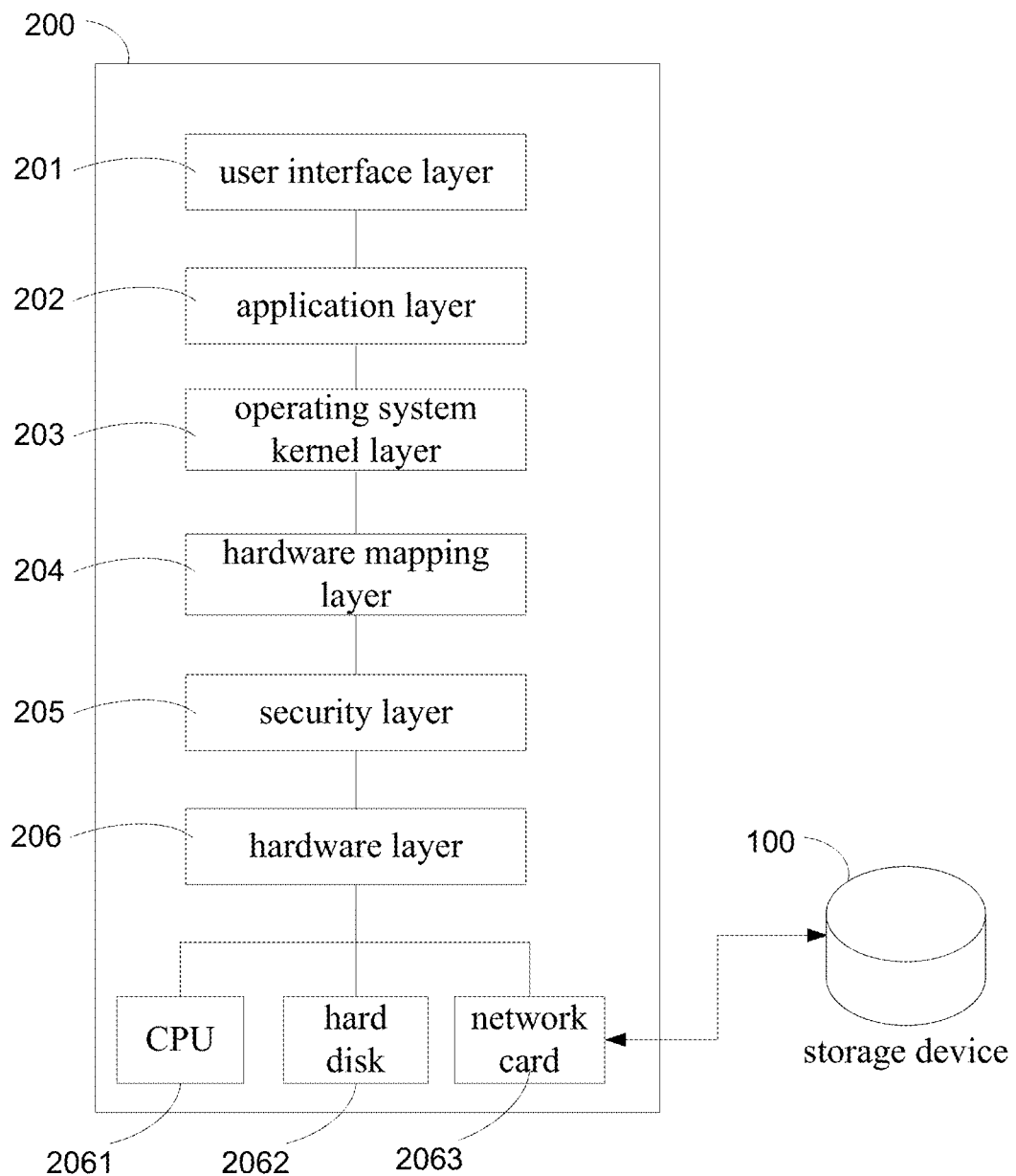
FIG. 9 is a schematic view showing an architect or layers of a computer terminal system provided in a tenth embodiment of the present disclosure.

To solve the above problems, embodiments of the present disclosure will be described in detail with reference to accompanying drawings hereinafter. FIG. 9 is a schematic diagram of a hierarchical structure of a computer terminal system in a tenth embodiment of the present disclosure. A computer terminal system 200 includes a user interface layer 201, an application layer 202, an operating system kernel layer 203, a hardware mapping layer 204, a security layer 205, and a hardware layer 206; the computer terminal system 200 is connected to a storage device 100 (i.e. a security device). The hardware layer 206 includes a CPU 2061, a hard disk 2062 (i.e. a local storage device) and a network card 2063. In this embodiment, the storage device 100 is a remote disk array, which exchanges data with the computer terminal system 200 by connecting with the network card 2063 of the hardware layer 206. In other embodiments of the present disclosure, the storage device 100 may also be other types of storage equipment.

Figure 10:
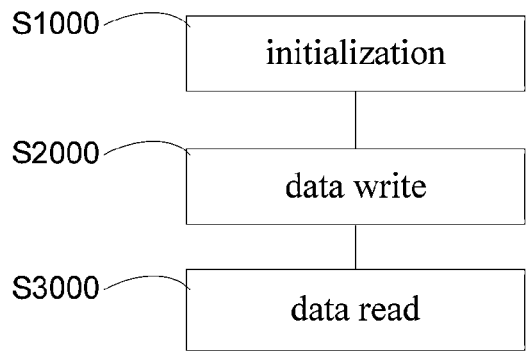
FIG. 10 is a flowchart of a whole process for data dumping provided in the tenth embodiment of the present disclosure.

Referring to the above hierarchical structure and referring to FIG. 10, the data dump process provided by this embodiment includes:

S1000, initialization;

S2000, data write process or data writing process; and

S3000, data read process or data reading process.

In other embodiments, the initialization, data write and data read process can be selectively carried out as required.

Figure 11:
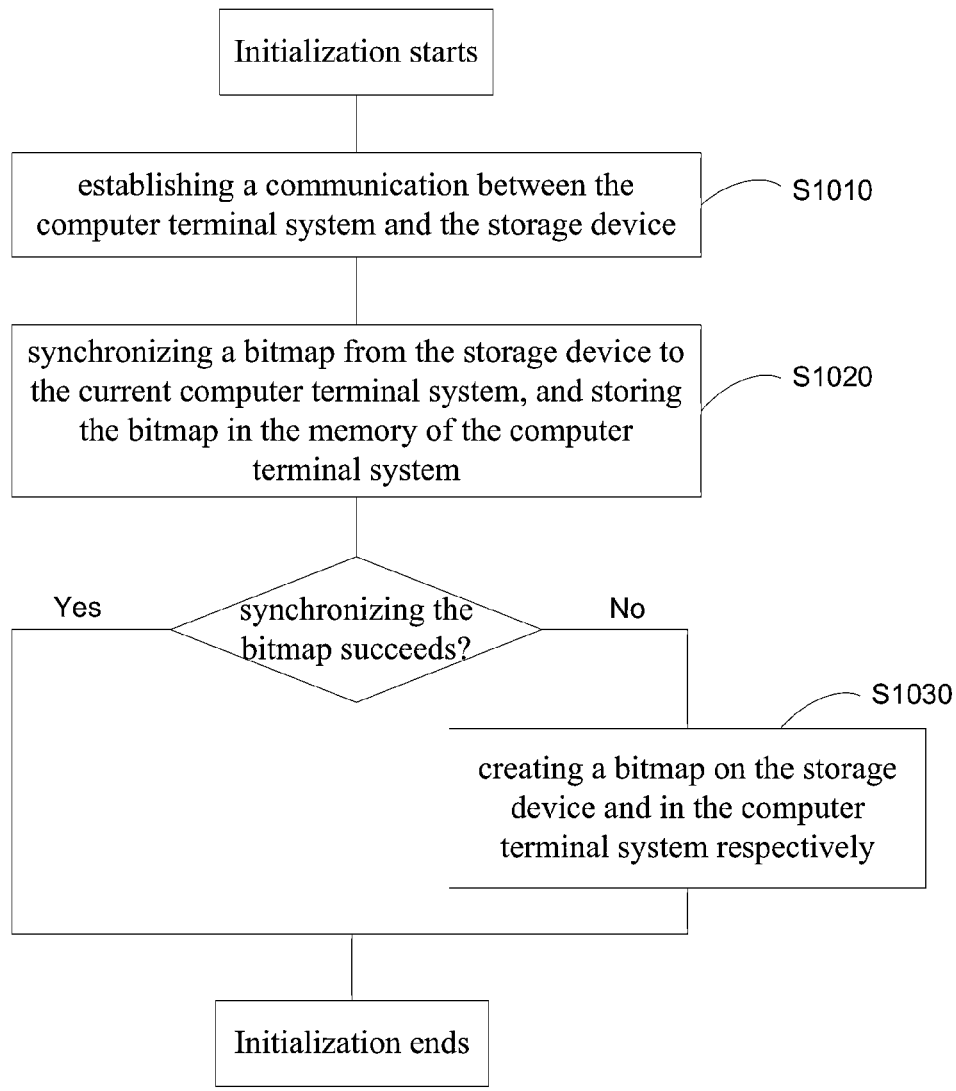
FIG. 11 is a flowchart of an initialization process S1000 in FIG. 10.

Further, referring to FIG. 11, the initialization process S1000 includes:

S1010, establishing a communication between the computer terminal system 200 and the storage device 100 (i.e. security device); and S1020, synchronizing a bitmap from the storage device 100 to the current computer terminal system 200, and storing the bitmap in the memory of the computer terminal system 200; the bitmap being used to represent whether or not data of local storage address is stored or dumped onto the security device.

To distinguish the bitmap of the computer terminal system 200 from that in the storage device 100, hereinafter, the bitmap of the computer terminal system 200 is, unless otherwise specified, referred to as a first bitmap or bitmap, and the bitmap in the storage device 100 is referred to as a second bitmap.

If synchronizing the second bitmap from the storage device 100 to the current computer terminal system 200 fails, it means that the storage device 100 and the computer terminal system 200 is connected for the first time, or that there was no storage operation in the computer terminal system 200 during previous connections. The initialization process S1000 further includes:

S1030, creating a bitmap on the storage device 100 and on the computer terminal system 200 respectively.

Specifically, first, the local storage space of the computer terminal system is mapped to the storage device 100, where the mapping relation is one-to-one mapping with sector (or other basic unit of storage) as the mapping unit, and a bitmap is created. In other embodiments of the present disclosure, other basic unit of storage can be used as the unit to establish the bitmap from the local storage space to the storage device 100.

Figure 12:
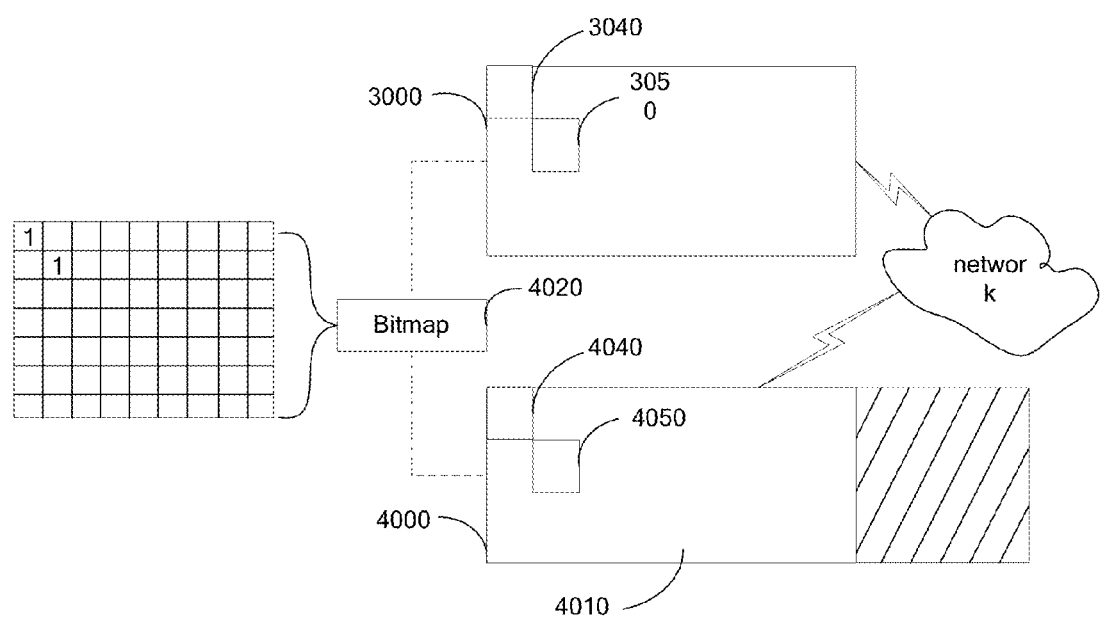
FIG. 12 is a schematic view showing a bitmap provided in the tenth embodiment of the present disclosure.

FIG. 12 is a schematic diagram of the bitmap in this embodiment, which includes a storage medium 3000 on a local storage device (i.e. a hard disk 2062), and a storage medium 4000 on the storage device 100 which is connected to the local storage device through network. For the storage medium 3000, a storage space 4010 having the same size is established on the storage medium 4000, which is used as the one-to-one mapping space. At this time, there is only one bitmap 4020 in the storage space 4010. The bitmap 4020 is a bit map, in which one bit represents one sector and the data (0 or 1) of the bit represents whether or not the corresponding sector of the storage medium 3000 is stored onto the storage space 4010 of the storage medium 4000. In this embodiment, sectors with data stored or dumped onto the storage space 4010 of the storage medium 4000 are marked with 1, and other sectors (non-dumped sectors) are marked with 0. After the bitmap 4020 is created, it is synchronized to the computer terminal system 200. When an application or the operating system is to save a data, e.g. a file, the file system of the operating system allocates a certain amount of storage space on the storage medium 3000 of the local storage device, e.g. sector 3040 and sector 3050, assigns the storage space to the file, and updates the local file allocation table. When the file is data dumped, bit data of the bitmap corresponding to the sector 3040 and sector 3050 are changed to 1, while sector 4040 and sector 4050 are allocated on corresponding positions on the storage medium 4000 to save the file.

After the initialization process is finished in this embodiment, the computer terminal system 200 and the storage device 100 store two bitmaps with the same data.

Further, the data write process S2000 includes:

S2010, the application layer 202 makes an operation request of writing file through the file system of the operating system kernel layer 203, or the operating system kernel layer 203 makes an operation request of writing file directly; or the application layer 202 makes an operation request of writing data to the hardware mapping layer 204 directly, or the operating system kernel layer 203 makes an operation request of writing data to the hardware mapping layer 204 directly;

S2020, the operating system kernel layer 203 translates the operation request of writing file to hardware port instructions (i.e. hardware instruction), and sends the hardware port instructions to the hardware mapping layer 204, the hardware port instructions containing the storage position (i.e. sector) to be written on; if the operation request of writing data is made directly to the hardware mapping layer 204, the request is already a hardware port instruction; and S2030, the security layer 205 modifies the writing position (i.e. sector) in the port instruction to the storage address on the storage device 100, updates the first bitmap by changing the bit data corresponding to the sector to 1 which represents this sector is data dumped; and the security layer 205 then sends the modified port instruction to the hardware layer 206.

After the above processes, the write process S2000 further includes:

S2040, the first bitmap is synchronized to the storage device 100 and saved as a second bitmap, which guarantees that the first bitmap on the computer terminal system 200 and the second bitmap on the storage device are the same. In other embodiments of the present disclosure, this synchronization operation can be carried out at last, e.g. before the computer terminal system 200 is power off.

After write process is carried out, the computer terminal system 200 doesn't store the writing data, since the writing data has been dumped or stored on the storage device 100.

Further, the data read process S3000 includes:

S3010, the second bitmap on the storage device 100 is synchronized to the computer terminal system 200 and saved as the first bitmap;

S3020, the application layer 202 makes an operation request of reading file through the file system of the operating system kernel layer 203, or the operating system kernel layer 203 makes an operation request of reading file directly; or the application layer 202 makes an operation request of reading data to the hardware mapping layer 204 directly, or the operating system kernel layer 203 makes an operation request of reading data to the hardware mapping layer 204 directly; and S3030, the security layer 205 receives a data read instruction from the hardware mapping layer 204, and acquires a read address (or source address) of the data read instruction; if this address is not an address of the storage device 100, the security layer searches the first bitmap, and if the bit data in the first bitmap corresponding to the read address represents that the data of the read address is dumped, the security layer 205 modifies the read address of the port instruction to the corresponding read address of the storage device 100; and the security layer 205 sends the modified port instruction to the hardware layer 206.

In step S3010, synchronizing the second bitmap from the storage device 100 to the computer terminal system 200 is to keep the consistency between the local data and the data on the security device after the reboot of the computer terminal system 200.

The above read process does not affect the current operation mode of users, and realizes data read operation of the dumped data on the security device (i.e. the storage device 100).

Figure 13:
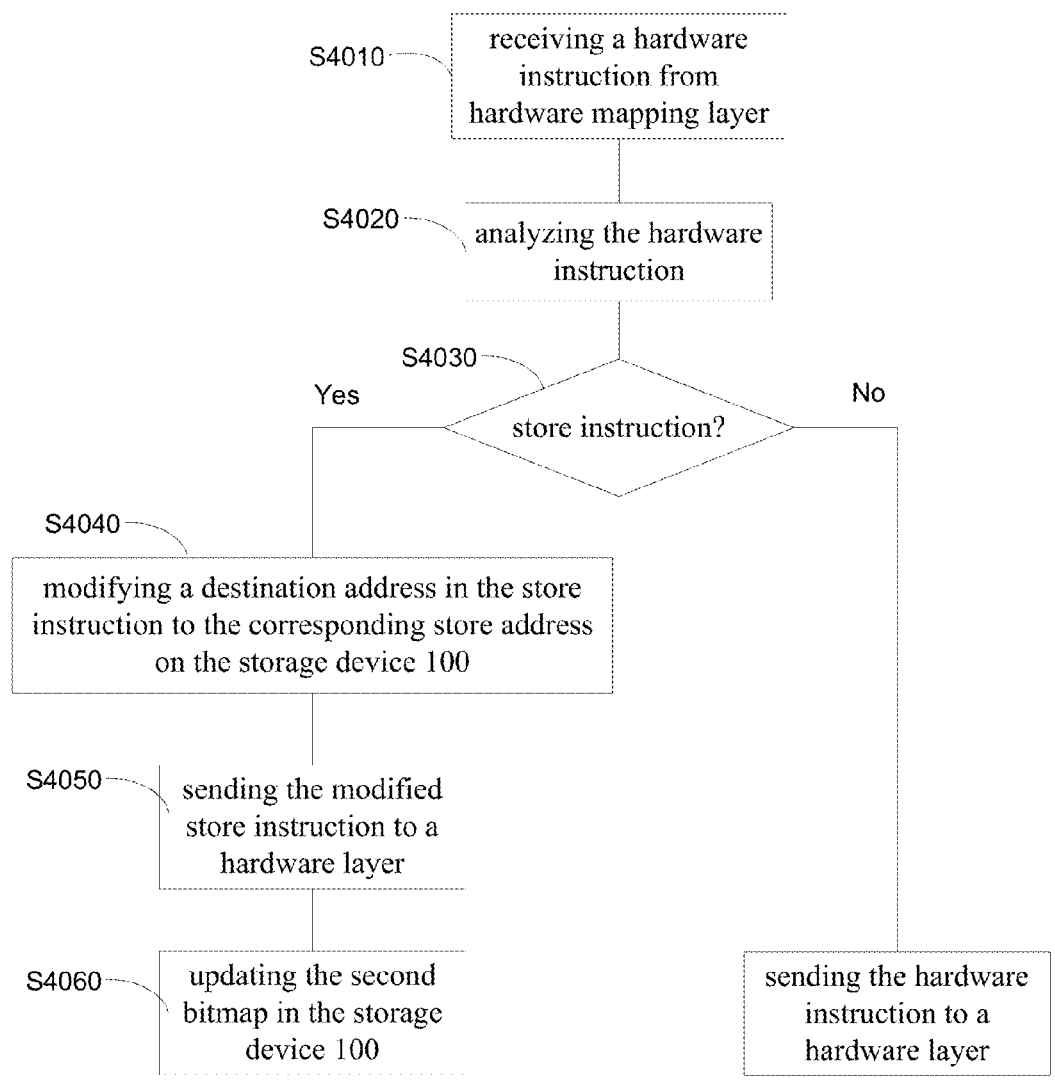
FIG. 13 is a flowchart of a data security storage method provided in the tenth embodiment of the present disclosure.

Further, based on the above data write process and referring to FIG. 13, a data security storage method provided in the embodiment includes:

S4010, receiving a hardware instruction;

S4020, analyzing the hardware instruction;

S4030, determining if the hardware instruction is a store instruction;

S4040, if the hardware instruction is a store instruction, modifying a destination address in the store instruction to the corresponding storage address on the storage device 100 (i.e. security device); and S4050, sending the modified store instruction to a hardware layer.

Specifically, in this embodiment, the operating system running on the computer terminal is Windows operating system, and in Windows, the hardware mapping layer is hardware abstract layer (HAL). In other embodiments, the operating system running on the computer terminal can be Linux, UNIX or other embedded operating system, and the hardware mapping layer is a layer corresponding to the HAL of Windows.

In step S4010, the hardware instruction is the hardware instruction from hardware mapping layer. Receiving hardware instructions from the hardware mapping layer can fully screen the hardware instructions (i.e. port instructions) sent to the processor such as CPU, which further improves the data security. In other embodiments of the present disclosure, the hardware instruction can also come from units corresponding to the operating system kernel layer or other computer layers.

In addition, together with the runtime instruction recombination method as discussed above, the procedure of receiving a hardware instruction may include: acquiring a hardware instruction using the runtime instruction recombination method.

In step S4020, there are various instruction analysis mechanisms within the security layer 205 to handle different types of CPU instruction, such as X86 instruction, ARM instruction, MIPS instruction, etc.

In step S4040, after modifying a destination address in the store instruction to the corresponding storage address on the storage device 100, the method can further include: updating the first bitmap by setting the 'bit' of the first bitmap which corresponds to the destination address (sector) to 1.

Further, in step S4040, the method can further include: synchronizing the updated bitmap to the security device and saving it as a second bitmap.

In step S4050, the security layer 205 forwards modified or unmodified hardware instructions to the hardware layer 206. In this embodiment, the data-dump operation of the security layer 205 is completely transparent to upper layers or users, which does not affect the work flow of current computers or applications.

The methods provided in this embodiment can not only be used in a computer terminal system, but also be used in any computing devices or intelligent terminals that include an application layer, an operating system kernel layer and a hardware layer, which achieves instruction level data dump (i.e. data dump based on hardware store instruction) before the hardware layer carries out instructions.

Figure 14:
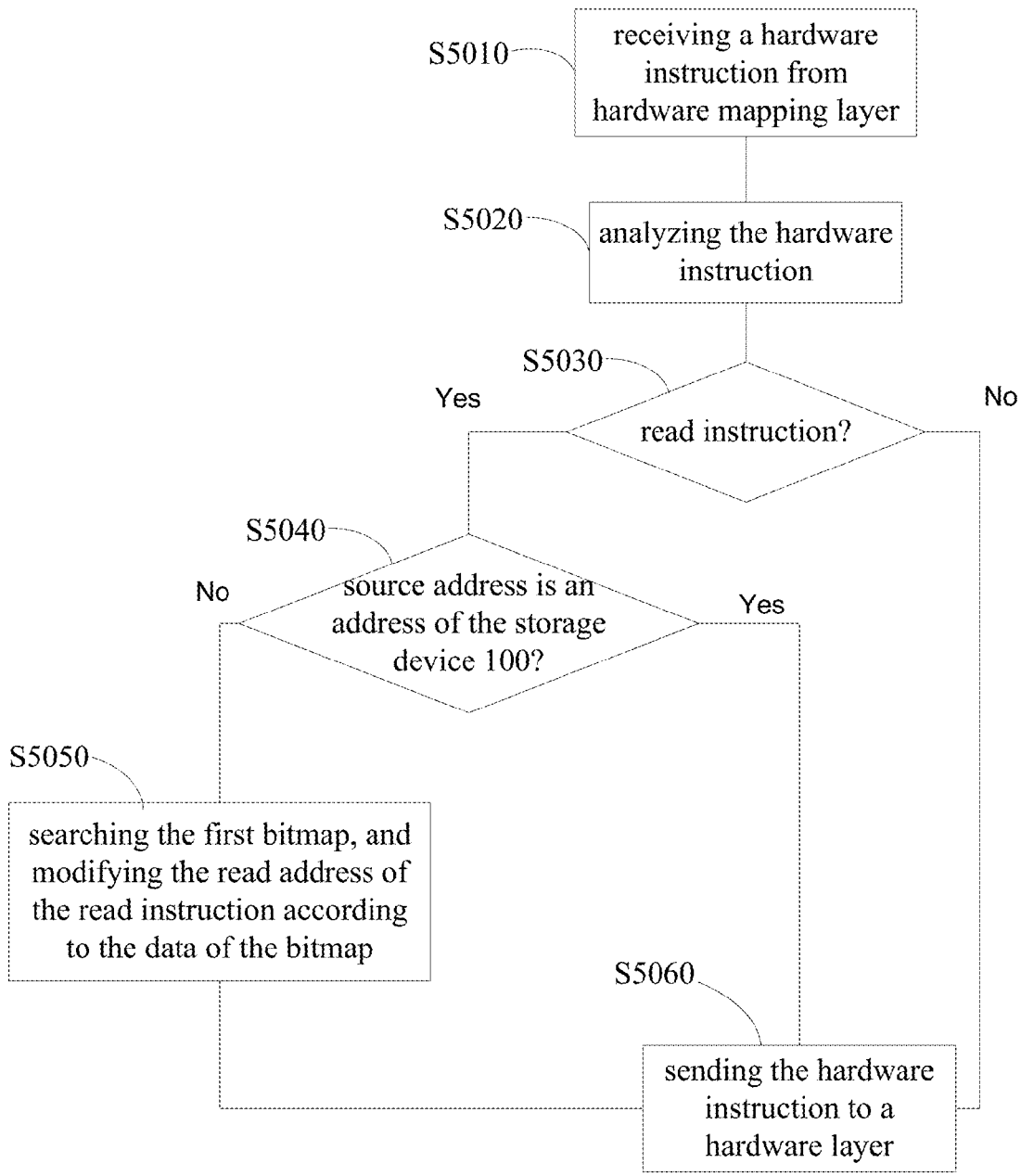
FIG. 14 is a flowchart of a data security reading method provided in the tenth embodiment of the present disclosure.

According to the above data read process, referring to FIG. 14, a data security reading method provided in the embodiment includes:

S5010, receiving a hardware instruction;

S5020, analyzing the hardware instruction;

S5030, determining if the hardware instruction is a read instruction;

S5040, if the hardware instruction is a read instruction, acquiring a source address of the read instruction, and determining if the source address is an address of the storage device 100;

S5050, if the source address is not an address of the storage device 100, searching the first bitmap, and modifying the read address of the read instruction according to the data of the bitmap; and S5060, sending the modified hardware instruction to a hardware layer.

Before the step S5010, the method can further include: S5000, synchronizing a second bitmap on the storage device 100 to the computer terminal system 200 and saving it as a first bitmap. In the step S5010 of this embodiment, the hardware instruction comes from a hardware mapping layer.

In addition, together with the above runtime instruction recombination method, receiving a hardware instruction may include: acquiring a hardware instruction using the runtime instruction recombination method.

In step S5030, if the hardware instruction is not a read instruction, the security layer 205 directly sends the hardware instruction to the hardware layer for execution.

In step S5040, if the source address is already an address of the storage device 100, the security layer 205 does not have to search the first bitmap and sends the hardware instruction to the hardware layer for execution.

Further, to save network resource, in some embodiments of the present disclosure, the storage device 100 can be shared among a plurality of terminal systems.

Figure 15:
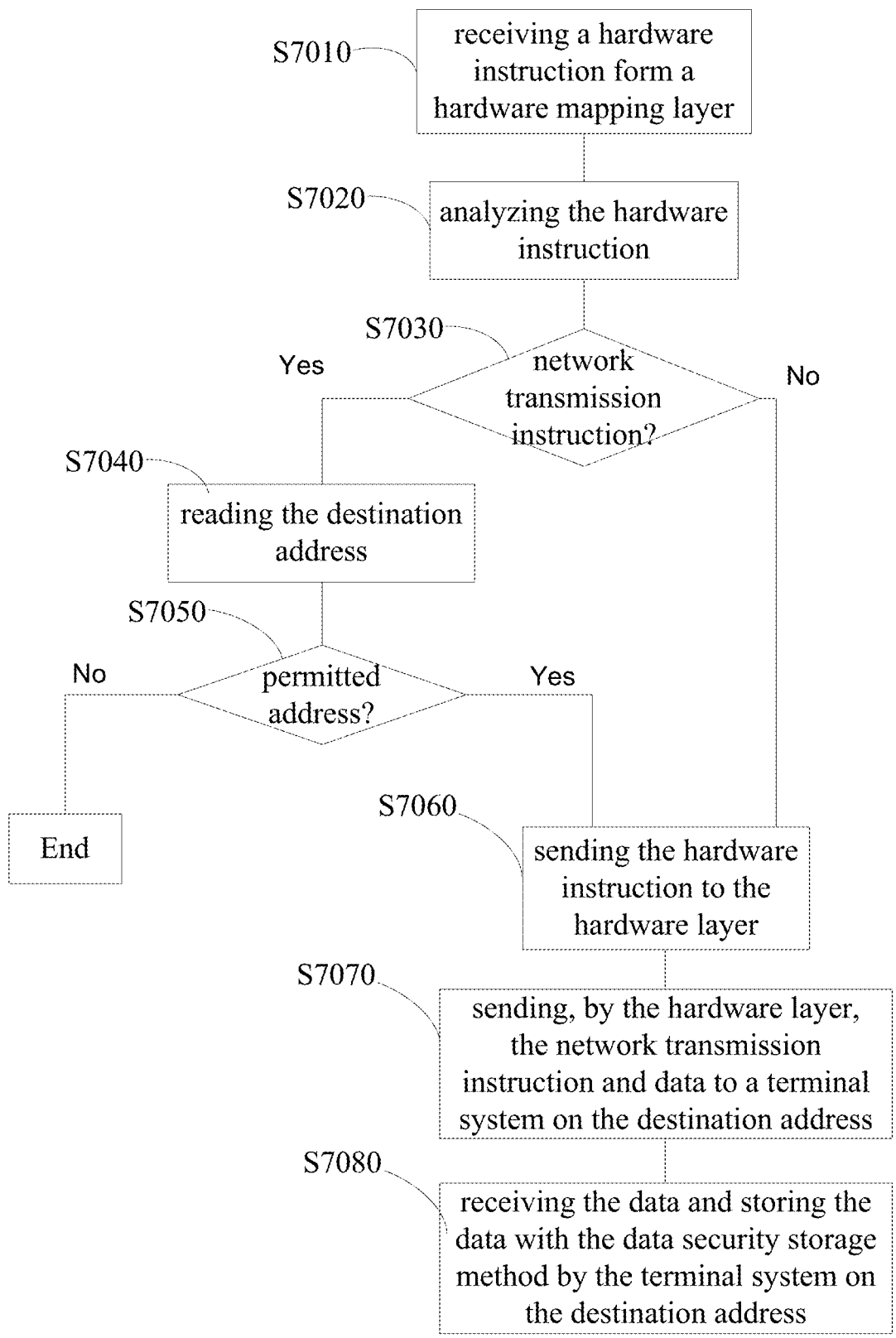
FIG. 15 is a flowchart of a data security transmission method provided in the eleventh embodiment of the present disclosure.

Further, based on the above data security storage and data security reading method, according to the eleventh embodiment of the present disclosure, there is provided a data security transmission method. As shown in FIG. 15, the data security transmission method includes:

S7010, receiving a hardware instruction form a hardware mapping layer;

S7020, analyzing the hardware instruction;

S7030, determining if the hardware instruction is a network transmission instruction;

S7040, if the hardware instruction is a network transmission instruction, reading a destination address;

S7050, determining if the destination address is a permitted address;

S7060, if the destination address is a permitted address, sending the hardware instruction to a hardware layer; and if the destination address is not a permitted address, blocking the hardware instruction and the method is finished this time;

S7070, sending, by the hardware layer, the network transmission instruction and data to a terminal system on the destination address; and S7080, receiving the data and storing the data with the data security storage method by the terminal system on the destination address.

In step S7060, if the destination address is not a permitted address, i.e. the terminal system on the destination address does not adopt the data security storage and data security reading method provided in the present disclosure, it is not allowed to be a destination address for network transmission operation.

Figure 16:
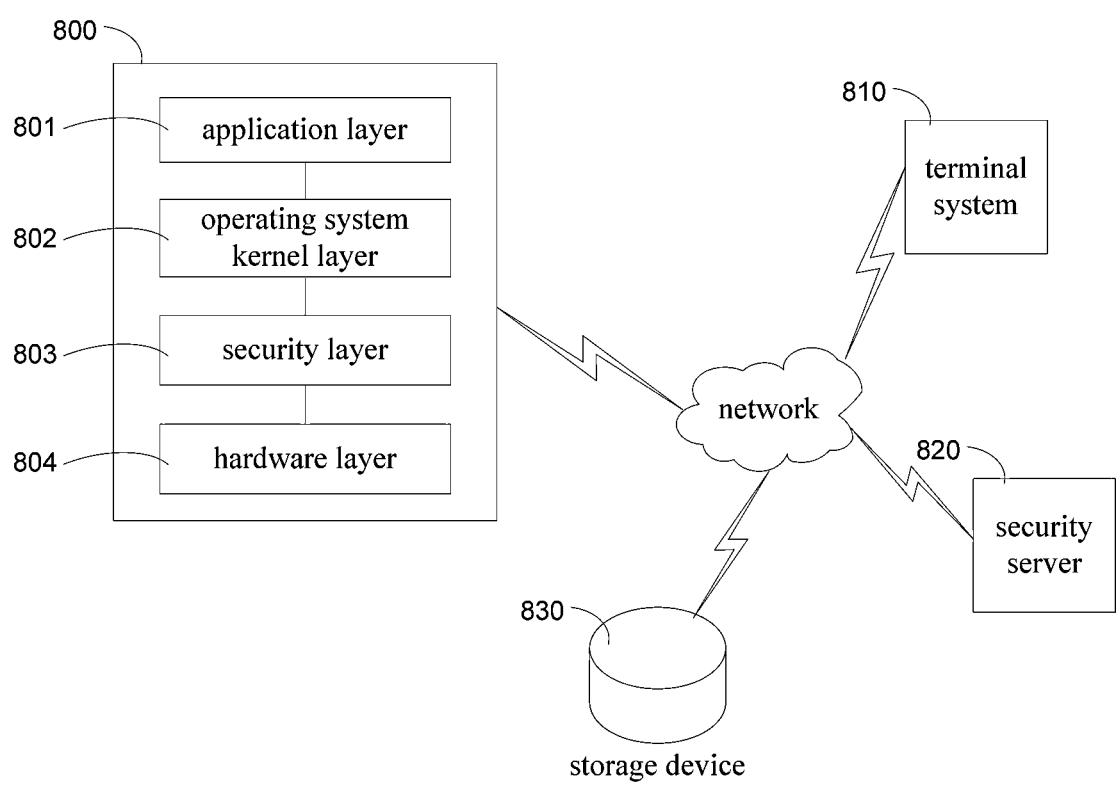
FIG. 16 is a schematic view showing a network structure provided in the eleventh embodiment of the present disclosure.

In step S7050, determining if the destination address is a permitted address is carried out in the following steps. As shown in FIG. 16, a security server 820 is connected with terminal systems 800 and 810 through network; when the data security transmission method provided in embodiments of the present disclosure is deployed in the terminal system 800 and 810, the terminal system 800 or 810 makes a registration to the security server 820 automatically; a permitted address table is maintained in the security server 820, which records all registered terminal systems. When the permitted address table is updated, the security server 820 automatically sends the new permitted address table to each terminal. The architecture of the terminal system 800 includes an application layer 801, an operating system kernel layer 802, a security layer 803 and a hardware layer 804, in which the security layer 803 is responsible for maintaining the permitted address table. The security layer 803 determines if the destination address is a permitted address by determining if the destination address is in the permitted address table. That is to say in step S7050, if a destination address is listed in the permitted address table, the destination address is a permitted address.

By the above data security transmission method, even if Trojan horses or malicious tools acquire confidential information, they cannot transmit the stolen information.

Although methods provided in the present disclosure are described within a computer terminal system, any electronic equipment that can provide file or data editing, saving or transmitting operation, such as handhelds and intelligent terminals, can be a terminal system to apply data security storage and transmission methods provided in the present disclosure.

In addition, one of ordinary skill in the art can appreciate that the above data security storage method, data security reading method and data security transmission method can be implemented in software or hardware, if in software, the above method steps can be stored in computer readable medium as computer codes, which can also become a software product.

Figure 17:
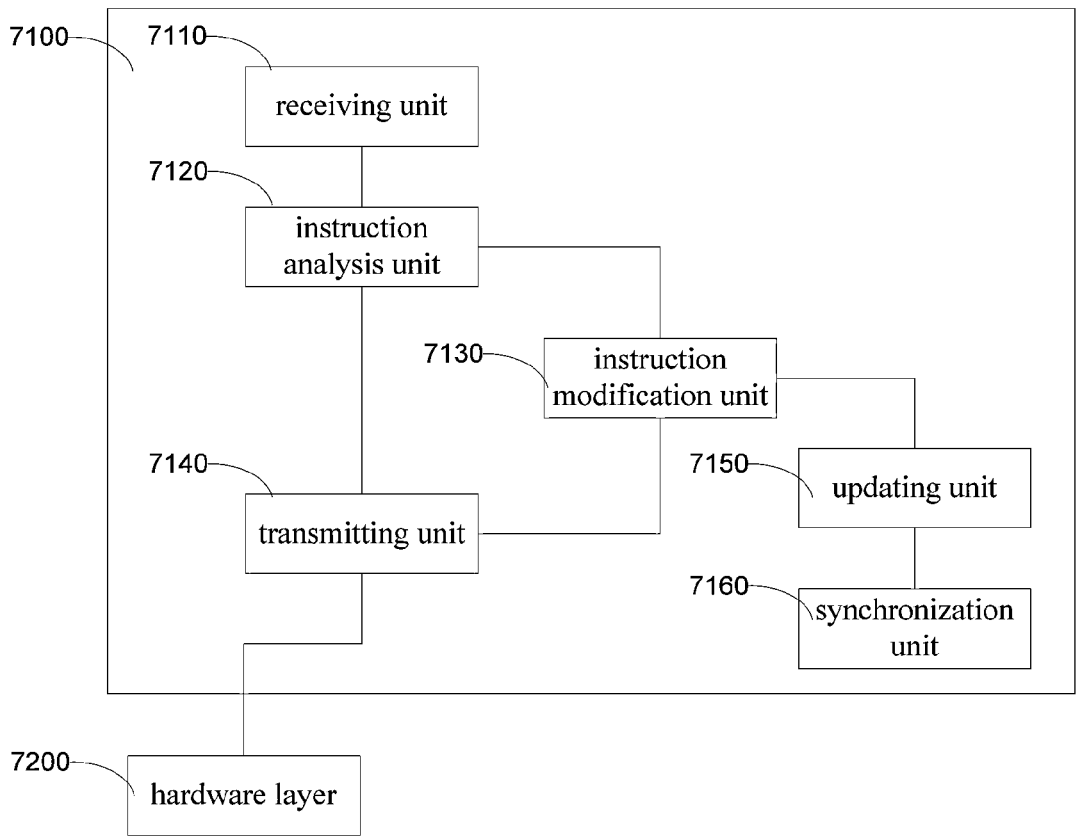
FIG. 17 is a schematic view showing a data security storage device provided in a twelfth embodiment of the present disclosure.

Corresponding to the above data security storage method, according to a twelfth embodiment of the present disclosure, there is provided a data security storage device. Referring to FIG. 17, a data security storage device 7100 includes: a receiving unit 7110, an instruction analysis unit 7120, an instruction modification unit 7130, and a transmitting unit 7140. The receiving unit 7110 is coupled with the instruction analysis unit 7120, the instruction analysis unit 7120 is also coupled with the instruction modification unit 7130 and the transmitting unit 7140, and the transmitting unit 7140 is also coupled with the instruction modification unit 7130 and the hardware layer 7200.

The receiving unit 7110 is adapted to receive a hardware instruction, and the hardware instruction comes from the hardware mapping layer in this embodiment; the instruction analysis unit 7120 is adapted to analyze the hardware instruction and to determine if the hardware instruction is a store instruction; if the hardware instruction is a store instruction, the instruction modification unit 7130 modifies the destination address of the store instruction to a corresponding storage address on a security device, and sends the modified store instruction to the transmitting unit 7140; if the hardware instruction is not a store instruction, the instruction analysis unit 7120 sends the hardware instruction directly to the transmitting unit 7140; the transmitting unit 7140 is adapted to send the received instruction to the hardware layer 7200.

Further, the data security storage device can also include an updating unit 7150 and a synchronization unit 7160, in which the updating unit 7150 is coupled with the instruction modification unit 7130 and the synchronization unit 7160 is coupled with the updating unit 7150.

The updating unit 7150 is adapted to update the bit that corresponds to the destination address in the bitmap after the instruction modification unit 7130 modifies the store instruction. In this embodiment, the bit data which corresponds to the sector at the destination address of the store instruction is set to '1' to represent that the sector is data dumped.

The synchronization unit 7160 is adapted to establish the communication between the computer terminal system and the security device, and to perform synchronization operation of the bitmap between the computer terminal system and the security device. Specifically, when the computer terminal system starts up, the synchronization unit 7160 establishes the communication between the computer terminal system and the security device, and synchronizes a second bitmap of the security device to the computer terminal system saving as a first bitmap.

If it fails to synchronize the second bitmap on the security device to the computer terminal system, it means that this is the first communication between the computer terminal system and the security device, then the synchronization unit 7160 maps the local storage space of the computer terminal system to the security device and creates a first bitmap and a second bitmap. In this embodiment, the second bitmap on the security device is built firstly and is then synchronized to the computer terminal system saving as the first bitmap.

When the updating unit 7150 updates the bit that corresponds to the destination address in the first bitmap, the synchronization unit 7160 sends the updated first bitmap to the security device, which is then saved as a second bitmap.

In this embodiment, the security device is a remote storage device, and may be shared among multiple computer terminal systems. The hardware instruction is a hardware port I/O instruction.

Figure 18:
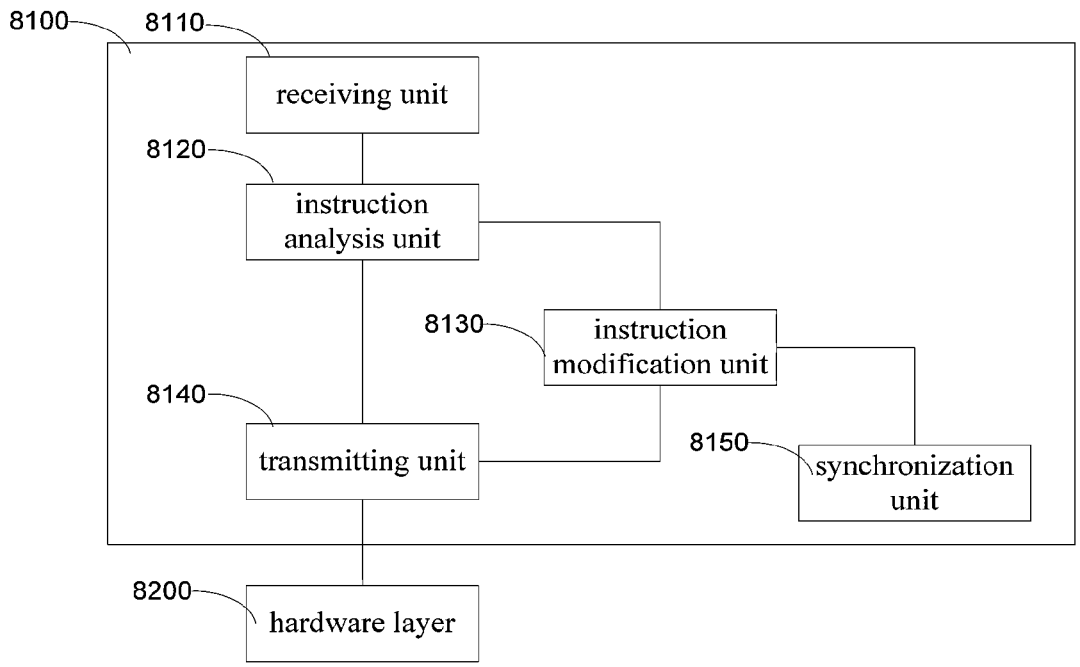
FIG. 18 is a schematic view showing a data security reading device provided in a thirteenth embodiment of the present disclosure.

Further, corresponding to the data security reading method as discussed above, according to a thirteenth embodiment of the present disclosure, there is provided a data security reading device. Referring to FIG. 18, a data security reading device 8100 includes: a receiving unit 8110, an instruction analysis unit 8120, an instruction modification unit 8130 and a transmitting unit 8140. The receiving unit 8110 is coupled with the instruction analysis unit 8120, the instruction analysis unit 8120 is also coupled with the instruction modification unit 8130 and the transmitting unit 8140 respectively, and the instruction modification unit 8130 is also coupled with the transmitting unit 8140. The transmitting unit 8140 is coupled with the hardware layer 8200.

The receiving unit 8110 is adapted to receive a hardware instruction, and the hardware instruction comes from the hardware mapping layer in this embodiment. The instruction analysis unit 8120 is adapted to analyze the hardware instruction and determine if the hardware instruction is a read instruction, and if the hardware instruction is a read instruction, the instruction analysis unit 8120 is also adapted to acquire the source address of the read instruction and determine if the source address is an address on the security device. If the hardware instruction is not a read instruction or the source address is an address on the security device, the instruction analysis unit 8120 sends the hardware instruction to the transmitting unit 8140. If the source address is not an address on the security device, the instruction modification unit 8130 looks up the bitmap, and modifies the read address of the read instruction according to the data of the bitmap. Similar to the above bitmap, the bitmap in this embodiment is used to represent whether or not data of local storage address is saved or data dumped onto the security device. Specifically, the instruction modification unit 8130 searches for the bit that corresponds to the sector at the source address in the first bitmap. If the 'bit' data shows 1, it means that data dump has happened; if the 'bit' data shows 0, it means that data dump has not happened. If data dump has happened, the instruction modification unit 8130 modifies the source address (or read address) to a corresponding data dump address, and sends the modified hardware instruction to the transmitting unit 8140.

Further, the data security reading device may also include a synchronization unit 8150. The synchronization unit 8150, which is coupled with the instruction modification unit 8130, is adapted to establish communication between the computer terminal system and the security device, and to synchronize bitmaps between the computer terminal system and the security device. Specifically, when the computer terminal system starts up, the synchronization unit 8150 establishes the communication between the computer terminal system and the security device, and synchronizes a second bitmap of the security device to the computer terminal system, which is saved as a first bitmap and to be used by the instruction modification unit 8130.

In this embodiment, the security device is a remote storage device which may be shared among multiple computer terminal systems. In other embodiments of the present disclosure, the security device may be a local storage device.

One of ordinary skill in the art would appreciate that the above method used in the security layer may also be used in various layers from the operating system kernel layer to the hardware layer. Various modifications can be made to choose different layer to implement the above method or device provided by the present disclosure without departing from the scope of spirit of the disclosure.

Data security storage method and device provided in the present disclosure are described in detail in the above embodiments; compared with the conventional art, the method and device have the following advantages: 1. the data security storage method achieves an instruction level data dump which is a full data dump, and achieves data security storage during the full operation time of a computer terminal system based on the full data dump; on the one hand, even if Trojan horses or malicious tools have acquired confidential information, they cannot save the stolen data, which guarantees that data are always in security zone or under control, on the other hand, no confidential information or data is saved locally, which prevents secret-related personnel from divulging secrets actively or passively; 2. By receiving hardware instructions from the hardware mapping layer, it can screen instructions 100%, which further improves data security.

Data security reading method and device provided in the present disclosure are described in detail in the above embodiments; compared with the conventional art, the method and device has the following advantages: 1. together with the data security storage method, the data security reading method guarantees that all data are in security zone under control, and that dumped data can be accessed or read; and since no confidential information or data is saved locally, it prevents secret-related personnel from divulging secrets actively or passively; 2. when the security device is a remote storage device, it may be shared by multiple terminals, which improves space utilization of the security device.

In other embodiments of the present disclosure, the above method used in the security layer may also be implemented in various layers from the bottom layer of the operating system to the upper layer of the hardware layer. One of ordinary skill in the art would appreciate that various modifications can be made to choose a different layer to implement the above methods or devices provided in the embodiments of the present disclosure without departing from the scope of spirit of the disclosure.

The above are only specific embodiments of the disclosure which are used to make those skilled in the art better understand the spirit of the disclosure, however, the scope of protection of the disclosure should not be limited to the specific descriptions of the specific embodiments, various modifications can be made to the specific embodiments of the disclosure by those skilled in the art without departing from the scope of spirit of the disclosure.

What is claimed is:

1. A method for data security reading, comprising:
    receiving a hardware instruction;
    analyzing, using at least one processor, the hardware instruction to determine whether the hardware instruction is a read instruction; and
    in response to determining that the hardware instruction is a read instruction:
        acquiring, using the at least one processor, a source address to which the read instruction is directed;
        looking up in a bitmap, using the at least one processor, the source address to which the read instruction is directed;
        determining, using the at least one processor, whether data associated with the source address to which the read instruction is directed is stored on a security device, where the security device is an external security device; and
        in response to determining that the data associated with the source address, to which the read instruction is directed, is stored on the security device:
            modifying, using the at least one processor, the source address to which the read instruction is directed according to the bitmap, thus obtaining a modified read instruction that is directed to the security device but not directed to a local storage device; and
            sending, to a hardware layer, the modified read instruction that is directed to the security device rather but not directed to the local storage device.

2. The method for data security reading of claim 1, wherein the hardware instruction comes from a hardware mapping layer.

3. The method for data security reading of claim 1, further comprising:
determining, using the at least one processor, whether the source address to which the read instruction is directed, is a source address of the security device; and
in response to determining that the hardware instruction is not a read instruction or in response to determining that the source address, to which the read instruction is directed, is the source address of the security device, sending the received hardware instruction to the hardware layer directly.

4. The method for data security reading of claim 1, further comprising:
before receiving a hardware instruction:
establishing, using the at least one processor, communication between a computer terminal system and the security device;
synchronizing, using the at least one processor, a second bitmap on the security device to the computer terminal system and saving it as a bitmap.

5. The method for data security reading of claim 1, wherein the security device is a remote storage device, which is shared by a plurality of computer terminal systems.

6. A device for data security reading, comprising:
at least one processor configured to:
receive a hardware instruction;
analyze the hardware instruction to determine whether the hardware instruction is a read instruction; and
in response to determining that the hardware instruction is a read instruction:
acquire a source address to which the read instruction is directed;
look up in a bitmap the source address to which the read instruction is directed;
determine whether data associated with the source address to which the read instruction is directed is stored on a security device, where the security device is an external security device; and
in response to determining that the data associated with the source address to which the read instruction is directed, is stored on the security device:
modify the source address to which the read instruction is directed according to the bitmap, thus obtaining a modified read instruction that is directed to the security device but not directed to a local storage device; and
send, to a hardware layer, the modified read instruction that is directed to the security device but not directed to the local storage device.

7. The device for data security reading of claim 6, wherein the hardware instruction comes from a hardware mapping layer.

8. The device for data security reading of claim 6, wherein the at least one processor is further configured to:
establish communication between a computer terminal system and the security device; and
synchronize a bitmap between the computer terminal system and the security device.

9. The device for data security reading of claim 6, wherein the security device is a remote storage device, which is shared by a plurality of computer terminal systems.

10. At least one non-transitory computer readable storage medium having instructions that, when executed by at least one processor, perform a method comprising:
receiving a hardware instruction;
analyzing the hardware instruction to determine whether the hardware instruction is a read instruction; and
in response to determining that the hardware instruction is a read instruction:
acquiring a source address to which the read instruction is directed;
looking up in a bitmap the source address to which the read instruction is directed;
determining whether data associated with the source address, to which the read instruction is directed, is stored on a security device, where the security device is an external security device; and
in response to determining that the data associated with the source address, to which the read instruction is directed is stored on the security device:
modifying the source address to which the read instruction is directed according to the bitmap, thus obtaining a modified read instruction that is directed to the security device but not directed to a local storage device; and
sending, to a hardware layer, the modified read instruction that is directed to the security device but not directed to the local storage device.

11. The method for data security reading of claim 1, wherein modifying the source address to which the read instruction is directed comprises modifying the source address to which the read instruction is directed to a corresponding source address on the security device.

12. The device for data security reading of claim 6, wherein the at least one processor is configured to:
modify the source address to which the read instruction is directed at least by modifying the source address to which the read instruction is directed to a corresponding source address on the security device.

13. The at least one computer readable storage medium of claim 10, wherein modifying the source address to which the read instruction is directed comprises modifying the source address to which the read instruction is directed to a corresponding source address on the security device.

14. The at least one computer readable storage medium of claim 10, wherein the hardware instruction comes from a hardware mapping layer.

15. The at least one computer readable storage medium of claim 10, the method further comprising:
determining whether the source address, to which the read instruction is directed, is a source address of the security device; and
in response to determining that the hardware instruction is not a read instruction or in response to determining that the source address to which the read instruction is directed is the source address of the security device, sending the received hardware instruction to the hardware layer directly.

16. The at least one computer readable storage medium of claim 10, the method further comprising:
before receiving a hardware instruction:
establishing communication between a computer terminal system and the security device; and
synchronizing a second bitmap on the security device to the computer terminal system and saving it as a bitmap.

17. The at least one computer readable storage medium of claim 10, wherein the security device is a remote storage device, which is shared by a plurality of computer terminal systems.

* * * * *